US012794961B2

(12) United States Patent
Iijima

(10) Patent No.: US 12,794,961 B2
(45) Date of Patent: Nov. 10, 2026

(54) INFORMATION PROCESSING APPARATUS, DISPLAY APPARATUS, COMMUNICATION METHOD, NON-TRANSITORY RECORDING MEDIUM, AND COMMUNICATION SYSTEM

(71) Applicant: Hideaki Iijima, Kanagawa (JP)

(72) Inventor: Hideaki Iijima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 105 days.

(21) Appl. No.: 18/782,950

(22) Filed: Jul. 24, 2024

(65) Prior Publication Data

US 2025/0055894 A1 Feb. 13, 2025

(30) Foreign Application Priority Data

Aug. 9, 2023 (JP) ................................ 2023-130181

(51) Int. Cl.
*H04L 65/4038* (2022.01)
*H04L 65/1093* (2022.01)
*H04W 12/76* (2021.01)

(52) U.S. Cl.
CPC ...... *H04L 65/4038* (2013.01); *H04L 65/1093* (2013.01); *H04W 12/76* (2021.01)

(58) Field of Classification Search
CPC . H04L 65/4038; H04L 65/1093; H04W 12/76
See application file for complete search history.

(56) References Cited

U.S. PATENT DOCUMENTS

| | | | | |
|---|---|---|---|---|
| 2013/0045678 A1* | 2/2013 | Lee | H04W 4/80 455/39 |
| 2014/0079045 A1* | 3/2014 | Kim | H04W 4/203 370/338 |
| 2014/0368863 A1* | 12/2014 | Suzuki | H04N 1/00888 358/1.14 |
| 2018/0285048 A1* | 10/2018 | Abraham | G09G 5/30 |
| 2023/0280794 A1 | 9/2023 | Iijima | |
| 2024/0070108 A1 | 2/2024 | Iijima | |
| 2024/0169954 A1* | 5/2024 | Namie | G06F 3/147 |

FOREIGN PATENT DOCUMENTS

| | | |
|---|---|---|
| EP | 2712264 | 3/2014 |
| EP | 2745618 | 9/2016 |
| JP | 2023-128391 A | 9/2023 |
| WO | 2016/163181 A1 | 10/2016 |

OTHER PUBLICATIONS

Extended European Search Report for 24190514.0 mailed on Jan. 15, 2025.

* cited by examiner

*Primary Examiner* — Vivek Srivastava
(74) *Attorney, Agent, or Firm* — IPUSA, PLLC

(57) ABSTRACT

An information processing apparatus includes circuitry to change a setting relating to a role of either a group owner or a client in response to a user operation, determine the role based on the setting related to the role, and wirelessly communicate with another information processing apparatus in the role that is determined.

14 Claims, 20 Drawing Sheets

FIG. 6
49
| SSID | REGISTRATION |
|---|---|
| ABCD1234 | REGISTERED |
| EFGH5678 | REGISTERED |
FIG. 7
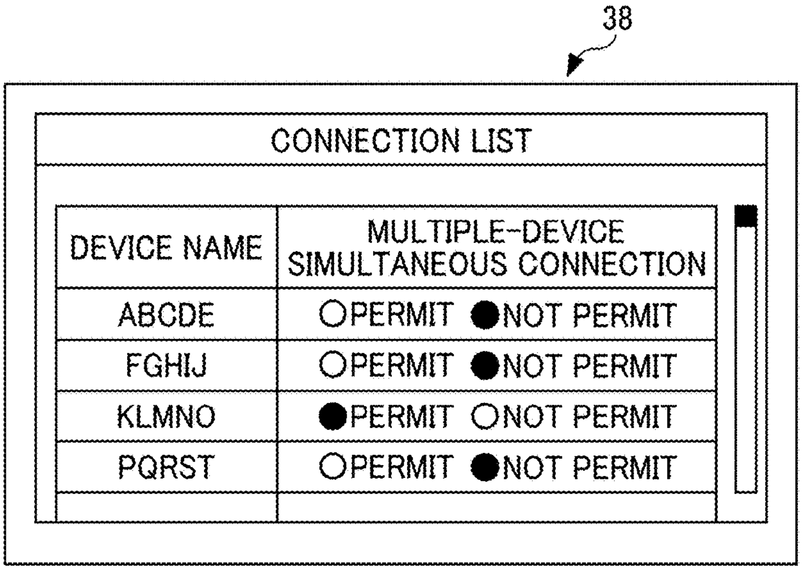
FIG. 8
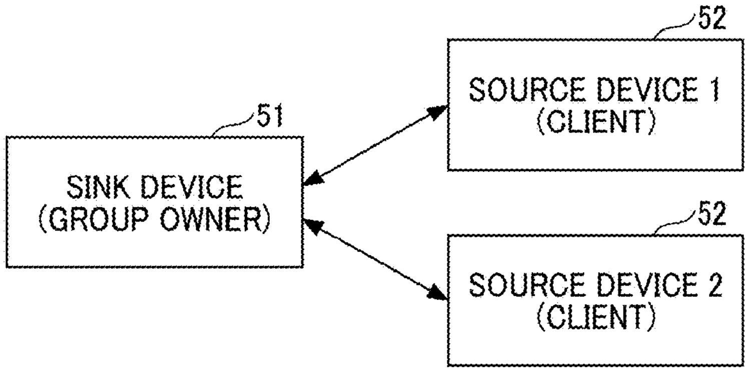

FIG. 14A
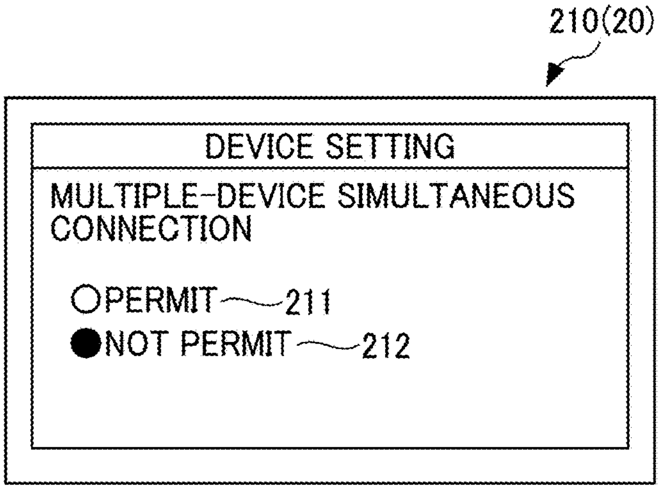
FIG. 14B
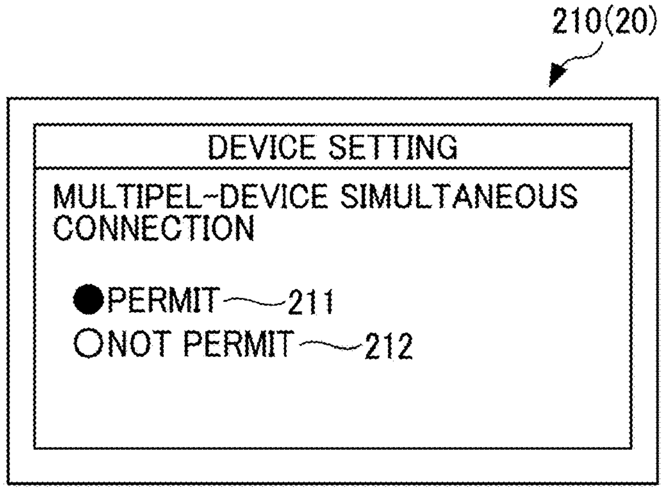
FIG. 15
| MULTIPLE-DEVICE SIMULTANEOUS CONNECTION | INTENT VALUE |
|---|---|
| PERMIT | 15 |
| NOT PERMIT | 0 |

INFORMATION PROCESSING APPARATUS, DISPLAY APPARATUS, COMMUNICATION METHOD, NON-TRANSITORY RECORDING MEDIUM, AND COMMUNICATION SYSTEM

CROSS-REFERENCE TO RELATED APPLICATIONS

This patent application is based on and claims priority pursuant to 35 U.S.C. § 119(a) to Japanese Patent Application No. 2023-130181, filed on Aug. 9, 2023, in the Japan Patent Office, the entire disclosure of which is hereby incorporated by reference herein.

BACKGROUND

Technical Field

The present disclosure relates to an information processing apparatus, a display apparatus, a communication method, a non-transitory recording medium, and a communication system.

Related Art

Wireless communication techniques such as MIRACAST for wirelessly transmitting a screen of, for example, a smartphone or a tablet terminal to a display are known. According to such wireless communication techniques, an information processing apparatus (referred to as a sink device) that receives a video (an image) and another information processing apparatus (referred to as a source device) that transmits the video form a network to communicate with each other. One of the sink device and the source device plays the role of a group owner of the network, and the other one of the sink device and the source device that does not play the group owner plays the role of a client.

The group owner is typically determined at the time of formation of the network. However, a technique is disclosed, in which the group owner is changed when still another device connects to the network after the formation of the network. According to the technique described above, even in the case where the network has already been formed, the degree of flexibility in connection form increases when other devices connect to the network later.

SUMMARY

In one aspect, an information processing apparatus includes circuitry to change a setting relating to a role of either a group owner or a client in response to a user operation, determine the role based on the setting related to the role, and wirelessly communicate with another information processing apparatus in the role that is determined.

In another aspect, a system includes the information processing described above and a display apparatus connected to the information processing apparatus. The display apparatus includes a display.

In another aspect, a communication method performed by an information processing apparatus includes changing a setting relating to a role of either a group owner or a client in response to a user operation, determining the role based on the setting related to the role, and wirelessly communicating with the another information processing apparatus in the role that is determined.

In another aspect, a non-transitory recording medium storing a plurality of program codes which, when executed by one or more processors, causes the one or more processors to perform the method described above.

In another aspect, a communication system includes an information processing apparatus and another information processing apparatus. The information processing apparatus wirelessly communicates with the another information processing apparatus in a role of either a group owner or a client and includes circuitry to change a setting relating to the role in response to a user operation, determines the role based on the setting related to the role, and wirelessly communicates with the another information processing apparatus in the role. The another information processing apparatus communicates with the information processing apparatus in the role different from the role that the information processing apparatus wirelessly communicates.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6 is a diagram illustrating a list of access points (APs) registered in a registered access point (AP) storage unit according to an embodiment of the present disclosure;

FIG. 7 is a diagram illustrating a connection list stored in a connection list storage unit according to an embodiment of the present disclosure;

FIG. 8 is a diagram illustrating a configuration in which multiple communication terminals are connected to a display apparatus, according to an embodiment of the present disclosure;

FIGS. 14A and 14B are diagrams each illustrating a multiple-device simultaneous connection setting screen displayed by a display apparatus according to an embodiment of the present disclosure;

FIG. 15 is a diagram illustrating the correspondence between a multiple-device simultaneous connection setting and an intent value according to an embodiment of the present disclosure;

Figure 1A:
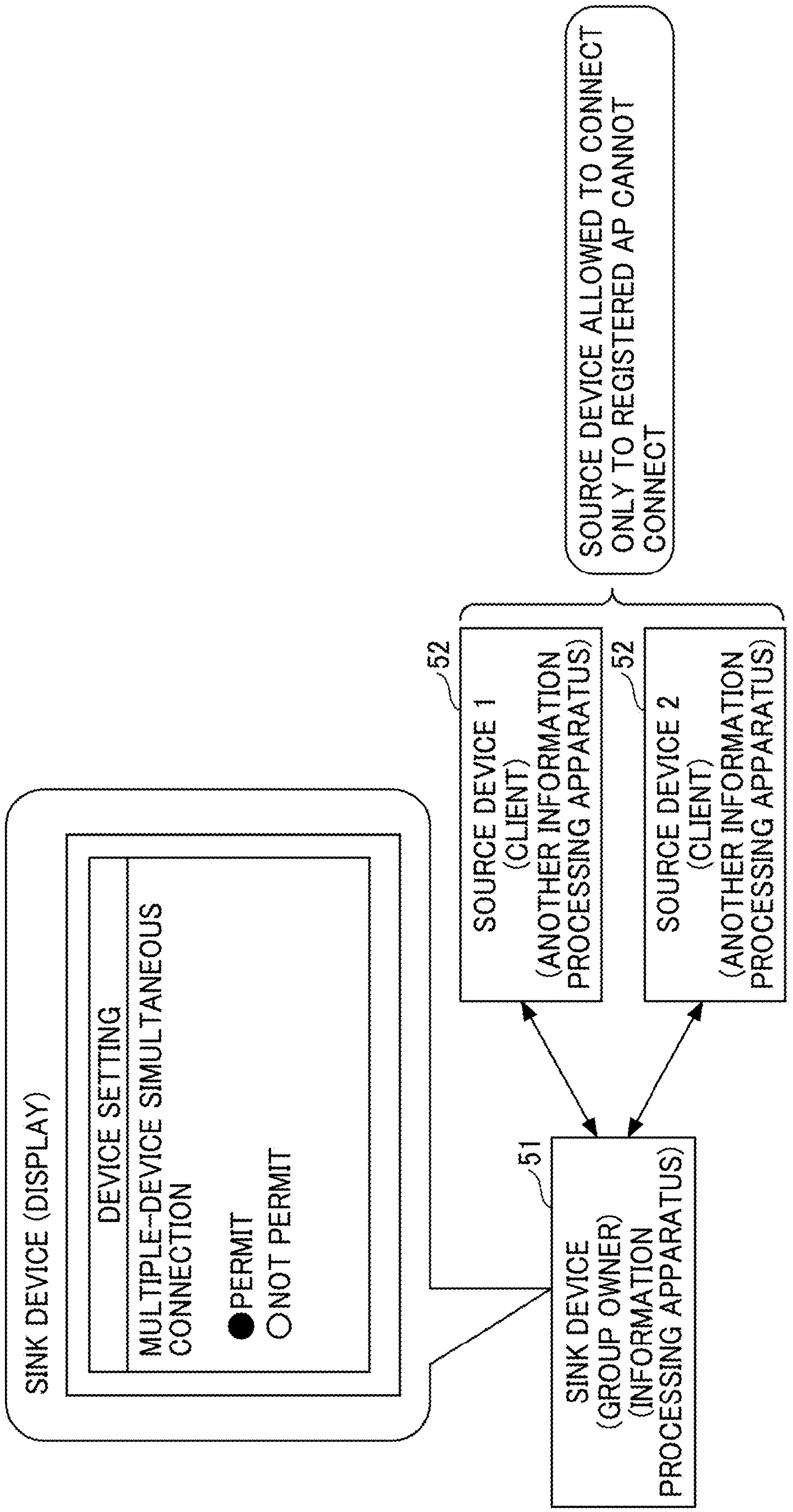
FIGS. 1A and 1B are diagrams each illustrating a connection method for the connection between a sink device and source devices according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A communication system and a communication method performed by the communication system according to embodiments of the present disclosure are described below with reference to the drawings.

Explanation about MIRACAST

As described above, according to the technique of MIRACAST, a source device (a transmission source of a video) and a sink device (a transmission destination of the video) form a network and wirelessly communicate, for example, video and audio with each other. A device that plays the role of a group owner is determined by a negotiation at the start of connection (at the time of formation of the network). Certain types of sink devices allow multiple source devices to connect to the sink devices simultaneously, and can display multiple videos (images) simultaneously. Such types of sink devices need to play the role of a group owner so that the multiple source devices can connect to the sink device simultaneously.

A device that has been determined to be the group owner (group owner device) provides functions similar to those of an access point (functions playing the role of an access point). The access point is sometimes referred to as an AP in the following description. A device that plays the role of a client can connect to the AP. Note that the group owner does not mediate the connection to the Internet. MIRACAST uses WI-FI Direct as a communication method, and devices that support WI-FI Direct have a function of an access point built in. The access point according to WI-FI Direct refers to a device or a function that accepts a connection request from a device of a communication counterpart. A device that plays the role of AP is called a group owner.

However, some companies prohibit the connection of a corporate device (a personal computer (PC) or smartphone) to any APs other than the APs registered in the corporate system according to the security policy of the company. Since the group owner of MIRACAST has a role similar to that of an AP, a source device that is prohibited from connecting to any APs other than the registered APs cannot connect to a sink device that plays the role of a group owner. Accordingly, since a sink device that allows multiple source devices to simultaneously connect to the sink device necessarily plays the role of a group owner (a function similar to an AP), a source device to which such a security policy described above is applied cannot connect to the sink device.

In general, a service set identifier (SSID) for identifying an AP is registered in the individual APs registered in the corporate system. According to MIRACAST, an SSID is automatically determined when a source device and a sink device form a network. In this case, a random string is inserted into the SSID to prevent duplication of SSIDs. For this reason, it is difficult for an administrator of the company to register the SSID of the sink device that communicates using the technique of MIRACAST in the corporate system. It is also difficult for the sink device to automatically register the SSID of the sink device in the corporate system from the viewpoint of security.

Under the circumstances described above, a source device that is prohibited from connecting to any APs other than the registered APs cannot connect to a sink device (a sink device that plays the role of a group owner) allowing multiple source devices to simultaneously connect to the sink device using the technique of MIRACAST.

Overview of Connection Process

In view of the above, the sink device according to the present embodiment controls the connection method as follows in accordance with the setting as to whether to permit the connection with multiple source devices.

Figure 1B:
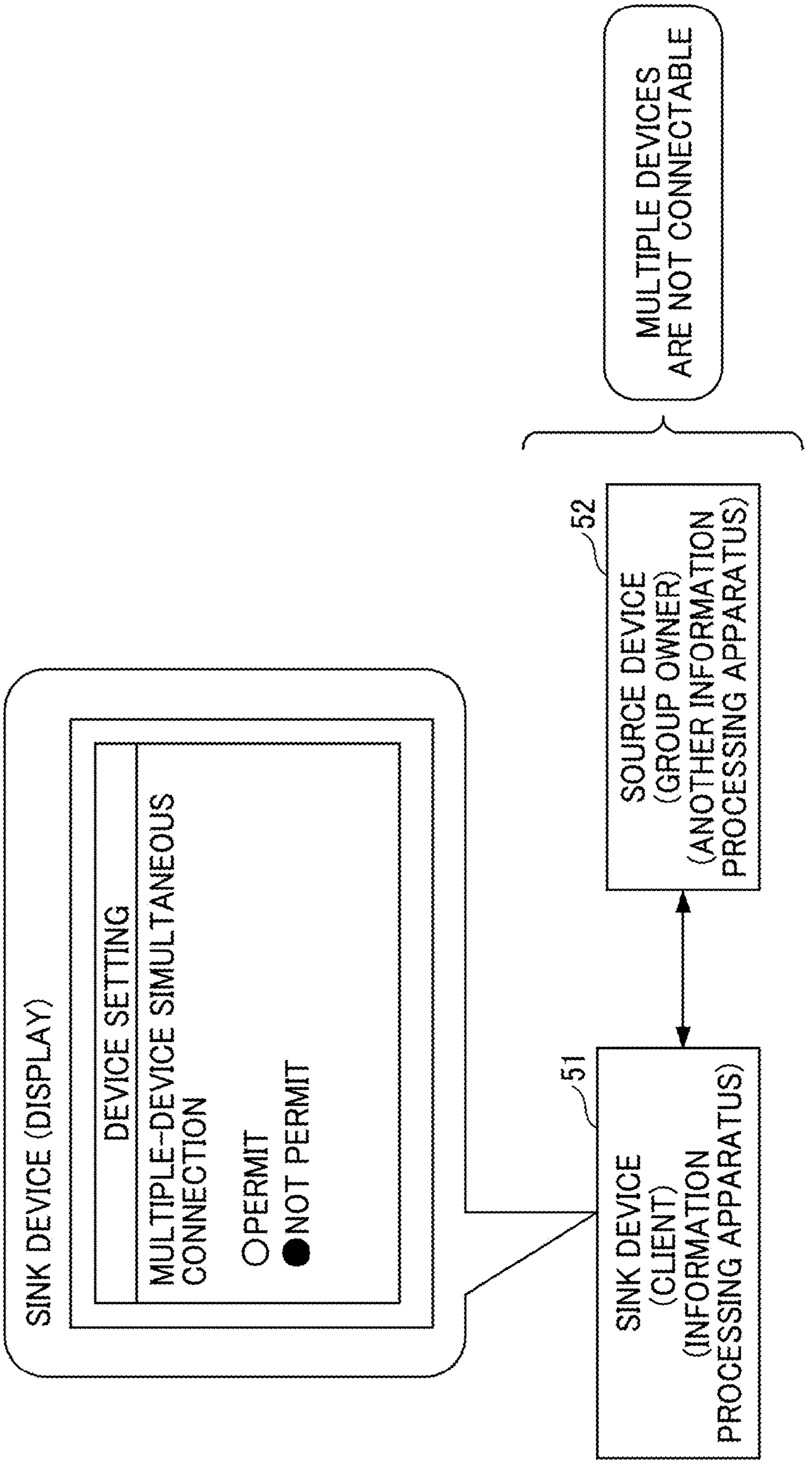

FIGS. 1A and 1B are diagrams each illustrating a connection method for the connection between a sink device 51 and source devices 52 according to the present embodiment. In the following description, the sink device 51 is referred to as a "display apparatus 20," and the source devices 52 are referred to as "communication terminals 40." In the following description, any one of the communication terminals 40 is referred to as a communication terminal 40 unless particularly distinguished from each other. It is assumed that no security policy is applied to the display apparatus 20.

As illustrated in FIG. 1A, in the case of the setting to permit the connection with multiple communication terminals 40, the display apparatus 20 plays the group owner and allows the multiple communication terminals 40 to simultaneously connect to the display apparatus 20. Although the details will be described later, an intent value used for determining a group owner in MIRACAST is changed according to the setting as to whether to permit the connection with the multiple communication terminals 40. By changing the intent value, the possibility that the display apparatus 20 plays the group owner increases. In this case, however, the communication terminal 40 that is allowed to connect only to the registered APs cannot connect to the display apparatus 20.

As illustrated in FIG. 1B, in the case of the setting not to permit the connection with multiple communication terminals 40, the display apparatus 20 plays a client and connects to the communication terminal 40 that is prohibited from connecting to any APs other than the registered APs. The communication terminal 40 plays the group owner. Similarly, the intent value is changed in accordance with the setting as to whether to permit the connection with multiple communication terminals 40. In this case, the display apparatus 20 cannot be simultaneously connected to the multiple communication terminals 40, but can be connected to the communication terminal 40 that is prohibited from connecting to any APs other than the registered APs.

In this way, according to the present embodiment, the communication terminal 40 that is set to be prohibited from connecting to any APs other than the registered APs can connect to the display apparatus 20. The communication terminal 40 is often set to be prohibited from connecting to any APs other than the registered APs despite that there is no risk of information leakage by the communication terminal 40 connecting to the display apparatus 20. According to the present embodiment, the inconvenience that the communication terminal 40 cannot connect to the display apparatus 20 is eliminated.

Terminology

The role refers to either the group owner or the client that each of the display apparatus 20 and the communication terminal 40 plays when wirelessly communicating with each other. Even if the role is not called a group owner or a client, any role equivalent to either of these corresponds to the role of the present embodiment.

The setting relating to the role refers to a multiple-device simultaneous connection setting (a setting as to whether multiple communication terminals 40 are permitted to simultaneously connect) to be set in the display apparatus 20. The multiple-device simultaneous connection setting can be set by an operator or may be automatically set.

The information processing apparatus refers to an apparatus that is primarily used as a sink device, and may or may not have a display. In the present embodiment, the information processing apparatus is described with the term of the display apparatus 20. Another (the other) information processing apparatus refers to an apparatus that is primarily used as a source device. In the present embodiment, another (the other) information processing apparatus is described with the term of the communication terminal 40.

Usage Scene of Communication System

As a usage scene of the communication system 100, for example, there is a situation in which an employee uses the communication terminal 40 to display a video on the display apparatus 20 shared in the company at a conference of the company. In this case, even when the communication terminal 40 used by the employee is allowed to connect only to the registered APs, by the display apparatus 20 playing the client and the communication terminal 40 playing the group owner, the display apparatus 20 can display the video received from the communication terminal 40. Such a usage scene is considered not only inside the company but also outside the company. Even when the communication terminal 40 used by an employee who is outside the company is restricted from connecting to the display apparatus 20, with the display apparatus 20 playing the client, the employee can display a video of the communication terminal 40 on the display apparatus 20.

Although not related to the setting of the group owner or the client, as another usage scene, for example, there is a situation in which a teacher uses the communication terminal 40 and a student uses the display apparatus 20 in a school. The teacher can proceed with a lecture while sharing the screen data of the communication terminal 40 with the display apparatus 20 used by each of multiple students. Each of the students can input the answer to an assignment or a question regarding the assignment onto the display apparatus 20 for sharing with the teacher. Also, handwritten data input by one of the students onto the display apparatus 20 can be shared among the communication terminal 40 and the display apparatus 20 used by each of the other students.

In addition, as usage scenes, there are various other situations in which a presenter uses the communication terminal 40 to share the screen data with participants, for example, a conference, a product briefing session, and a presentation.

The display apparatus 20 may be a thin display apparatus that incorporates a battery (or may not incorporate a battery) and is portable. Accordingly, the display apparatus 20 is carried together with the communication terminal 40, and can be used as an extended display of the communication terminal 40 when connected to the communication terminal 40 at the time of use.

For example, the display apparatus 20 may be used as an extended display for displaying a presentation made by a sales representative at a customer site. Further, for example, the display apparatus 20 may be used as an external display for the communication terminal 40 such as a PC at an office. Furthermore, for example, the display apparatus 20 may be used as an extended display for watching a video or working at home when the display apparatus 20 is connected to a smartphone used by an individual outside an office.

Configuration of Communication System

Figure 2:
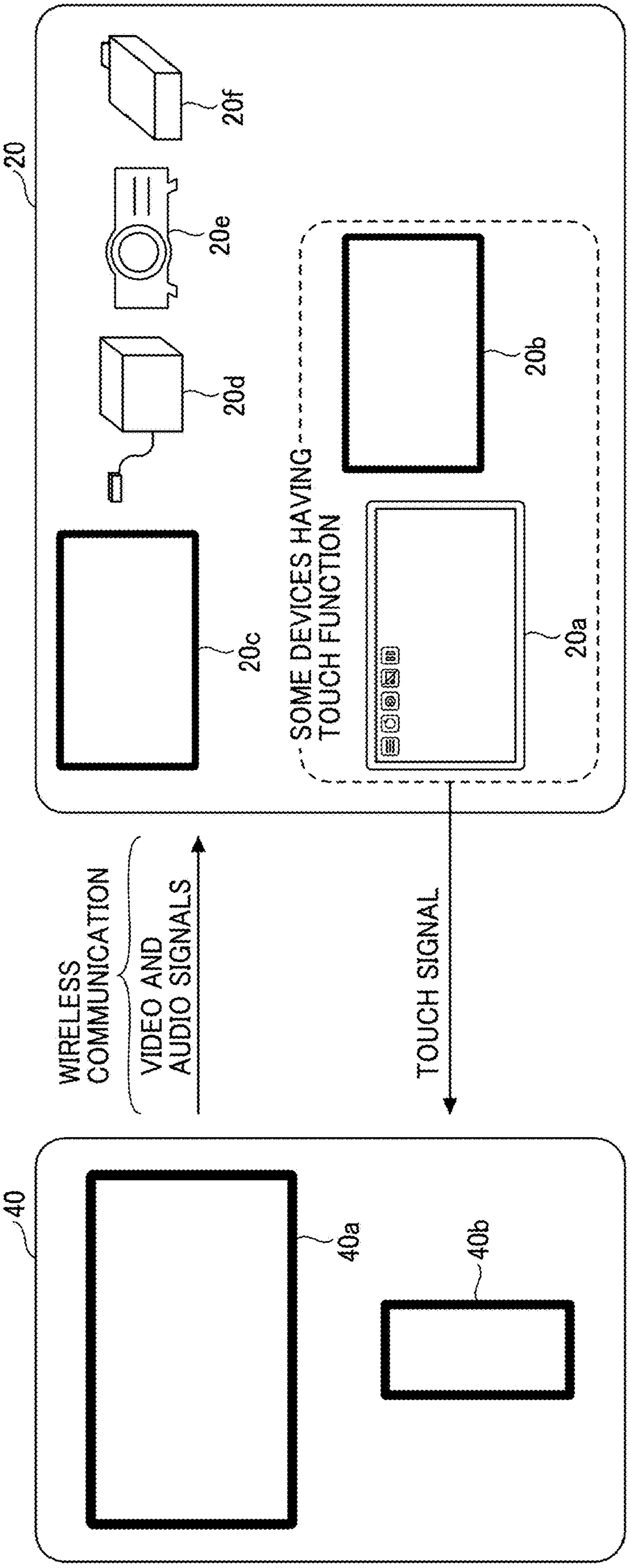
FIG. 2 is a schematic diagram illustrating a configuration of a communication system according to an embodiment of the present disclosure.

With reference to FIG. 2, a configuration of the communication system 100 is described below. FIG. 2 is a schematic diagram illustrating a configuration of the communication system 100 according to the present embodiment. The communication terminal 40 and the display apparatus 20 can wirelessly communicate with each other. Examples of wireless communication methods include WI-FI Direct and BLUETOOTH, but the communication method is not particularly limited. In addition, the communication method does not have to be one-to-one communication (peer-to-peer (P2P)), but may be communication via an ordinary access point (WI-FI router). Alternatively, the communication terminal 40 and the display apparatus 20 may communicate with each other via the same server apparatus. In this case, the communication terminal 40 and the display apparatus 20 are associated with each other by the server apparatus. The server apparatus transmits video and audio input from the communication terminal 40 to the display apparatus 20 and transmits a touch signal input from the display apparatus 20 to the communication terminal 40.

As communication standards that enable the wireless communication between the communication terminal 40 and the display apparatus 20, for example, MIRACAST, GOOGLE CAST, and AIRPLAY are known. The communication terminal 40 and the display apparatus 20 communicate with each other using these communication standards or communication methods enhanced from the communication standards. For example, MIRACAST is a display transmission technique for one-to-one wireless communication designed by the WI-FI Alliance. MIRACAST can transmit, using a streaming technology, images, audio, and video from a host device to another device wirelessly paired with the host device. MIRACAST is a technique that enables display performed using a dedicated cable to be performed wirelessly. Since the functions implemented by, for example, HIGH-DEFINITION MULTIMEDIA INTERFACE (HDMI) are implemented wirelessly, MIRACAST is sometimes called wireless HDMI.

The communication terminal 40 and the display apparatus 20 may be connected to each other via a wired video output interface such as HDMI, DISPLAYPORT, or THUNDERBOLT. Regardless of the form of the connection, the communication terminal 40 can transmit at least one of the video and the audio to the display apparatus 20, and the display apparatus 20 can transmit the touch signal to the communication terminal 40. Accordingly, the communication between the communication terminal 40 and the display apparatus 20 is bidirectional. However, the transmission from the display apparatus 20 to the communication terminal 40 may have a narrow band or may not be needed.

The communication terminal 40 may be, for example, a PC 40*a* (such as a desktop PC or a laptop PC), a smartphone 40*b*, or a tablet terminal used by the operator. The communication terminal 40 may be any communication terminal that can execute at least an application that supports wireless communication and an application for playing back video. The communication terminal 40 is typically portable to be carried by the operator, but may be of a stationary type. The communication terminal 40 may have a general-purpose configuration, and does not require any special hardware or installation of an application dedicated to the present embodiment. However, when a dedicated application is installed in the display apparatus 20 of the present embodiment, the convenience is further enhanced for the operator.

A device that transmits contents (sources) to be output, such as the communication terminal 40, is referred to as a source device 52. The source device 52 does not refer to a specific device but to a transmission source of the contents. Similarly, a device that receives contents to be output, such as the display apparatus 20, is referred to as the sink device 51. The sink device 51 does not refer to a specific device but to a transmission destination of the contents. Accordingly, the communication terminal 40 may serve as the sink device 51, and the display apparatus 20 may serve as the source device 52.

The display apparatus 20 is, for example, a display 20*a* such as a liquid crystal display or an organic electroluminescence (EL) display, a PC 20*b* (of a display integrated type), a television receiver 20*c*, a set-top box 20*d*, a projector 20*e*, or a wireless communication device 20*f*. The display apparatus 20 may be, for example, a portable display apparatus, an electronic whiteboard, a smartphone, a tablet terminal, a television set, a monitor, a signage apparatus, or a medical image display device. The display apparatus 20 is any display apparatus that has at least a wireless communication function, and may further have a display function. The display 20*a*, the PC 20*b*, the television receiver 20*c*, and the projector 20*e* each have a display function, whereas neither of the set-top box 20*d* or the wireless communication device 20*f* has a display function.

The display apparatus 20 (except for the wireless communication device 20*f*) has a wireless communication function that may be built in or externally attached. Since the wireless communication device 20*f* is a device having a wireless communication function in itself, the wireless communication device 20*f* may be externally attached to the display apparatus 20 except for the wireless communication device 20*f*. For example, when the wireless communication device 20*f* is connected to a universal serial bus (USB) interface (I/F) of the display 20*a*, the PC 20*b*, the television receiver 20*c*, the set-top box 20*d*, or the projector 20*e*, which does not have the built-in wireless communication function, the device can wirelessly communicate with the communication terminal 40. A situation in which the wireless communication device 20*f* is connected to the display 20*a*, the PC 20*b*, the television receiver 20*c*, the set-top box 20*d*, or the projector 20*e* may be referred to as a wireless video display system.

As the set-top box 20*d*, for example, a cable television receiver and a satellite broadcast receiver are known. As the wireless communication device 20*f*, for example, a device conforming to the above-described MIRACAST, GOOGLE CAST, or AIRPLAY and externally attached to a display using a USB or the like, and a stick-type PC (dongle PC) are known.

In the display apparatus 20, an application that supports wireless communication is installed in advance or can be installed later, or the wireless communication function is built in or can be retrofitted. A part or an entirety of the wireless communication function may be implemented by hardware circuits.

The display apparatus 20 preferably includes a touch panel. The display apparatus 20 wirelessly transmits a touch signal generated by the operator touching the display apparatus 20 to the communication terminal 40. Accordingly, the operator can operate the communication terminal 40 by operating the display apparatus 20.

Hardware Configuration

Figure 3:
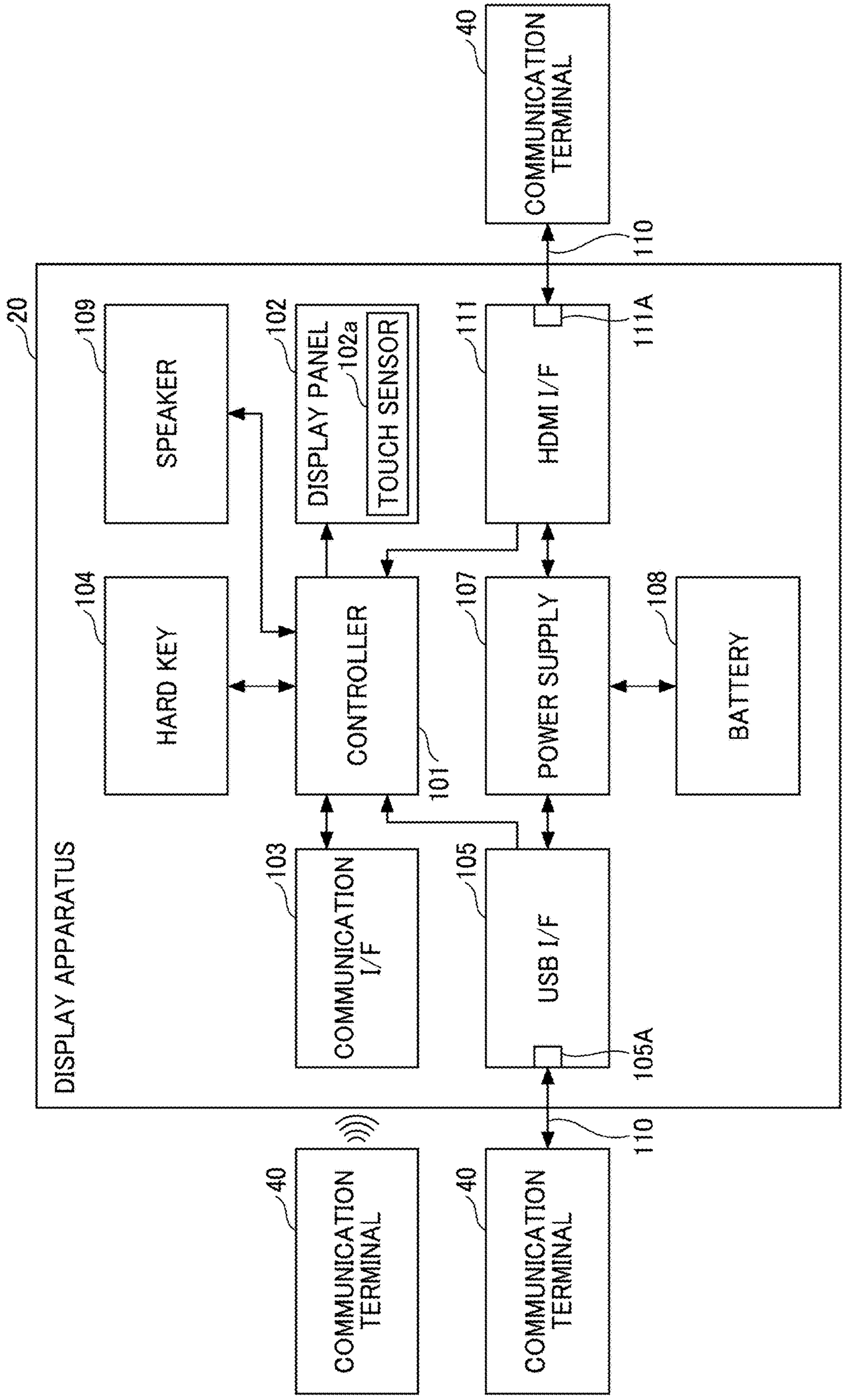
FIG. 3 is a block diagram illustrating a hardware configuration of a display apparatus according to an embodiment of the present disclosure.
Figure 4:
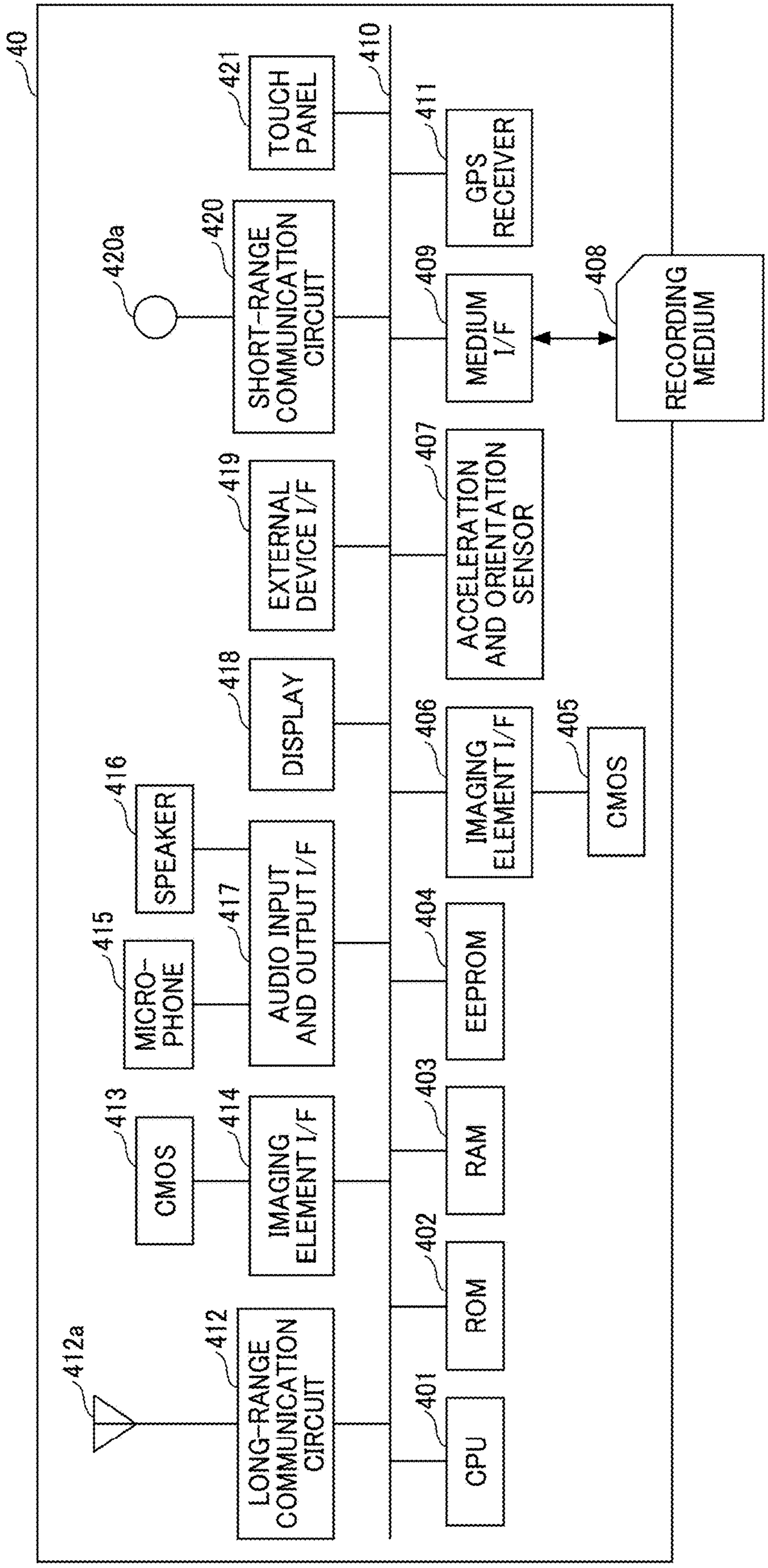
FIG. 4 is a block diagram illustrating a hardware configuration of a communication terminal according to an embodiment of the present disclosure.

With reference to FIGS. 3 and 4, hardware configurations of the display apparatus 20 and the communication terminal 40 are described below.

Hardware Configuration of Display Apparatus

FIG. 3 is a block diagram illustrating a hardware configuration of the display apparatus 20 according to the present embodiment. The display apparatus 20 illustrated in FIG. 3 includes a display panel 102 on the front face of the housing. The display apparatus 20 is an apparatus that receives a video signal from the communication terminal 40 by wireless communication or via a video cable 110 to display a video on the display panel 102 according to the video signal.

As illustrated in FIG. 3, the display apparatus 20 includes a controller 101, the display panel 102, a communication I/F 103, a hard key 104, a speaker 109, a USB I/F 105, an HDMI I/F 111, a power supply 107, and a battery 108.

The controller 101 controls the entire operation of the display apparatus 20. For example, the controller 101 is implemented by a control circuit such as an integrated circuit (IC) including a central processing unit (CPU), a read-only memory (ROM), and a random access memory (RAM).

On the display panel 102 (an example of a display device), various images (such as videos and still images) are displayed according to video signals transmitted from the controller 101. As the display panel 102, for example, a liquid crystal display or an organic EL display may be used. On the front face of the display panel 102, a touch sensor 102*a* is provided so as to overlap the display panel 102. The speaker 109 outputs various kinds of audio according to the audio signals supplied from the controller 101.

The communication I/F 103 is an interface that controls the wireless connection (including the wireless communication) with the communication terminal 40. The communication I/F 103 wirelessly communicates with the communication terminal 40 (e.g., a laptop personal computer or a smartphone), and transmits and receives (i.e., performs wireless communication) control signals and video signals to and from the communication terminal 40. The communication I/F 103 uses, for example, WI-FI as a wireless communication standard.

The hard key 104 is an interface that receives an input from the operator with an operation performed by the operator. For example, the display apparatus 20 includes a plurality of buttons on the side faces and the front face of the housing as hard keys 104. These buttons are, for example, a power button, a selection button, an enter button, and a return button. The hard keys 104 are not limited to the above-described buttons. The display apparatus 20 may include, as the hard key 104, for example, a screen mute key which is a hard key that serves as a screen mute icon used for invalidating an operation to the screen. For example, in response to operations performed by the operator to the hard keys 104, the display apparatus 20 turns on and off the power and performs various settings such as settings of brightness and contrast.

The USB I/F 105 is an interface for connecting the communication terminal 40. The USB I/F 105 includes a USB port 105A compliant with the USB standard. To the USB port 105A, a USB cable such as the video cable 110 is connected. Accordingly, the USB I/F 105 is connected to the communication terminal 40 via the USB cable. For example, when a communication terminal (e.g., a laptop PC or a smartphone) is connected to the USB I/F 105 as the communication terminal 40, the USB I/F 105 transmits and receives control signals, video signals, and electric power to and from the communication terminal. Further, for example, when an external power supply is connected to the USB I/F 105 as the communication terminal 40, the USB I/F 105 receives electric power supplied from the external power supply.

The display apparatus 20 often includes a plurality of USB I/Fs 105, and the communication terminal 40 can be connected to each of the USB I/Fs 105. Although only one USB I/F 105 is illustrated in FIG. 3 to simplify the drawing, the display apparatus 20 may be provided with two or more USB I/Fs 105.

The HDMI I/F 111 is an interface for connecting the communication terminal 40. The HDMI I/F 111 includes an HDMI port 111A compliant with the HDMI standard. To the HDMI port 111A, an HDMI cable such as the video cable 110 is connected. Accordingly, the HDMI I/F 111 is connected to the communication terminal 40 via the HDMI cable. For example, when a communication terminal (e.g., a laptop PC or a smartphone) is connected to the HDMI I/F 111 as the communication terminal 40, the HDMI I/F 111 transmits and receives control signals, video signals, and electric power to and from the communication terminal.

The power supply 107 controls the supply of electric power to each component of the display apparatus 20 to drive each component. For example, when the electric power is not supplied from the communication terminal 40 (such as an external power supply or a communication terminal) or when the electric power supplied from the communication terminal 40 (such as an external power supply or a communication terminal) is insufficient, the power supply 107 can supply the electric power stored in the battery 108 to each component of the display apparatus 20. Further, for example, when the electric power is supplied from the communication terminal 40 (such as an external power supply or a communication terminal), the power supply 107 can supply the electric power supplied from the communication terminal 40 to each component of the display apparatus 20. Furthermore, for example, the power supply 107 can pass through the electric power supplied from the communication terminal 40 (such as an external power supply or a communication terminal) connected to the USB I/F 105 or the HDMI I/F 111 and supply the electric power to another communication terminal 40 (such as a communication terminal) connected to another USB I/F 105 or HDMI I/F 111.

The battery 108 stores the electric power to drive the display apparatus 20. Various kinds of rechargeable secondary batteries (for example, a lithium-ion battery and a lithium polymer battery) are usable as the battery 108. The display apparatus 20 (for example, the power supply 107) can charge the battery 108 with the electric power supplied from the communication terminal 40 (such as an external power supply or a communication terminal) connected to the USB I/F 105 or the HDMI I/F 111.

Hardware Configuration of Communication Terminal

FIG. 4 is a block diagram illustrating a hardware configuration of the communication terminal 40 according to the present embodiment. In FIG. 4, by way of example, a smartphone is used as the communication terminal 40. As illustrated in FIG. 4, the communication terminal 40 includes a CPU 401, a ROM 402, a RAM 403, an electrically erasable programmable read-only memory (EEPROM) 404, a complementary metal oxide semiconductor (CMOS) sensor 405, an imaging element I/F 406, an acceleration and orientation sensor 407, a medium I/F 409, and a global positioning system (GPS) receiver 411.

The CPU 401 controls the entire operation of the communication terminal 40. The ROM 402 stores, for example, a program used by the CPU 401 and a program such as an initial program loader (IPL) to boot the CPU 401. The RAM 403 is used as a work area for the CPU 401.

The EEPROM 404 reads or writes various data such as a program for the communication terminal 40 under the control of the CPU 401.

The CMOS sensor 405 is a kind of built-in imaging device that captures an image of an object (typically, a self-image of the operator) under the control of the CPU 401 to obtain the image data. In alternative to the CMOS sensor, an imaging device such as a charge-coupled device (CCD) sensor may be used.

The imaging element I/F 406 is a circuit that controls driving of the CMOS sensor 405. The acceleration and orientation sensor 407 serves as various sensors such as an electromagnetic compass for detecting geomagnetism, a gyrocompass, and an acceleration sensor.

The medium I/F 409 controls the reading and writing (storing) of data from and to a recording medium 408 such as a flash memory. The GPS receiver 411 receives a GPS signal from a GPS satellite.

The communication terminal 40 includes a long-range communication circuit 412, a CMOS sensor 413, an imaging element I/F 414, a microphone 415, a speaker 416, an audio input and output I/F 417, a display 418, an external device I/F 419, a short-range communication circuit 420, an antenna 420*a* of the short-range communication circuit 420, and a touch panel 421.

The long-range communication circuit 412 is a circuit for communicating with other devices via a wired or wireless network. The long-range communication circuit 412 can perform wireless communication using WI-FI. The CMOS sensor 413 is a kind of built-in imaging device that captures an image of an object under the control of the CPU 401 to obtain the image data.

The imaging element I/F 414 is a circuit that controls driving of the CMOS sensor 413. The microphone 415 is a built-in circuit that converts audio into electrical signals.

The speaker 416 is a built-in circuit that converts electrical signals into physical vibrations to generate audio such as music or voice. The audio input and output I/F 417 is a circuit that processes input and output of audio signals between the microphone 415 and the speaker 416 under the control of the CPU 401.

The display 418 is a kind of display that displays an image of an object and various icons, such as a liquid crystal display or an organic EL display. The external device I/F 419 is an interface for connection with various external devices.

The short-range communication circuit 420 is a communication circuit in compliance with, for example, the near field communication (NFC) or BLUETOOTH. The touch panel 421 is a kind of input device that allows the operator to operate the communication terminal 40 by touching a screen of the display 418.

The communication terminal 40 includes a bus line 410. The bus line 410 is, for example, an address bus or a data bus, which electrically connects the components or elements such as the CPU 401 illustrated in FIG. 4.

Functions

Figure 5:
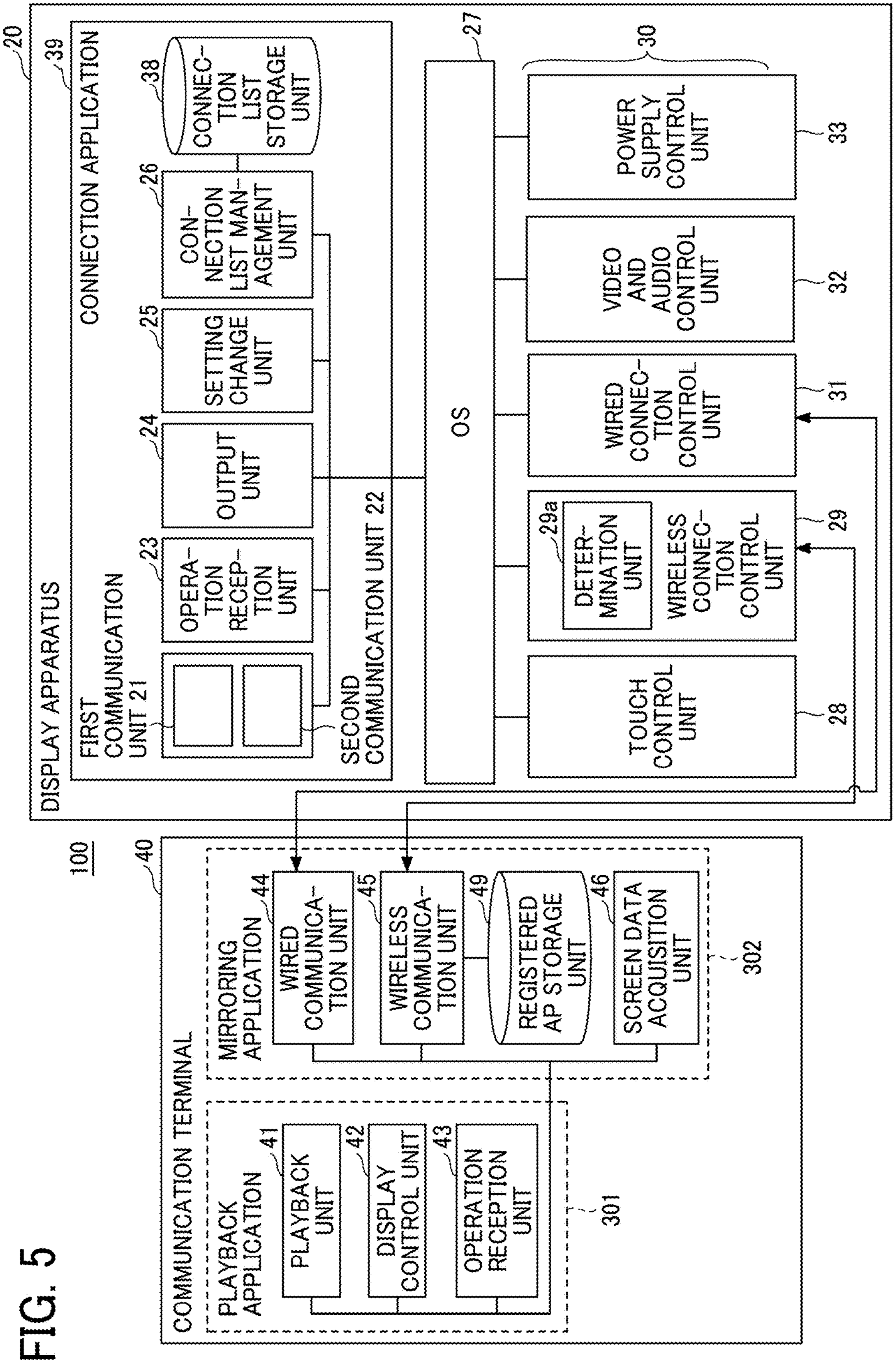
FIG. 5 is a block diagram illustrating functional configurations of a communication terminal and a display apparatus, according to an embodiment of the present disclosure.

With reference to FIG. 5, functional configurations of the communication terminal 40 and the display apparatus 20 are described below. FIG. 5 is a block diagram illustrating functional configurations of the communication terminal 40 and the display apparatus 20, according to the present embodiment.

Functions of Communication Terminal

On the communication terminal 40, a playback application 301 and a mirroring application 302 operate. The playback application 301 includes a playback unit 41, a display control unit 42, and an operation reception unit 43. The mirroring application 302 includes a wired communication unit 44, a wireless communication unit 45, and a screen data acquisition unit 46. These functional units included in the communication terminal 40 provide functions implemented by the CPU 401 illustrated in FIG. 4 executing instructions included in one or more programs installed in the communication terminal 40. The one or more programs are, for example, the playback application 301 and the mirroring application 302.

The playback application 301 is an application that plays back various contents. However, since the communication terminal 40 can transmit the very screen displayed on the display 418, the playback application 301 may not be needed. The mirroring application 302 is an application that acquires (captures) a screen displayed on the display 418 and transmits the screen to the display apparatus 20. There is no problem even if the playback application 301 and the mirroring application 302 are integrated.

The playback unit 41 decodes or expands video data that has a data format specific to a video to reconstruct the video into a frame (an image corresponding to one screen). In addition, the playback unit 41 can change the resolution of an image in accordance with the resolution of a display panel and interpolate frames.

The display control unit 42 causes the frame generated by the playback unit 41 to be displayed on the display panel 102. The frame rate is, for example, between 30 frames per second and 120 frames per second.

The operation reception unit 43 receives an operation to the playback application 301 performed by the operator. Examples of the operation that the operation reception unit 43 receives are operations relating to the playback of a video, such as starting or stopping the playback of the video, going back or going forward the video by a certain number of seconds, adjusting the audio volume, and adjusting the brightness. The operation reception unit 43 receives operations similar to the above-described operations in response to touch signals received by the wired communication unit 44 or the wireless communication unit 45 from the display apparatus 20. The operation reception unit 43 receives operations of the wireless connection setting for the communication terminal 40 performed by the operator.

The screen data acquisition unit 46 acquires (captures), as screen data, an entirety or a part (a portion of the contents of the playback application, a desired application, or an area designated by the operator) of the screen displayed on the display 418 at a certain speed (the number of vibration frequencies per second).

The wired communication unit 44 repeatedly transmits the screen data acquired by the screen data acquisition unit 46 to each of multiple display apparatuses 20 using a video cable such as the HDMI cable, the USB cable, or a DISPLAYPORT cable.

The wireless communication unit 45 repeatedly transmits the screen data acquired by the screen data acquisition unit 46 to each of multiple display apparatuses 20 using wireless communication such as WI-FI or BLUETOOTH. The speed at which the wireless communication unit 45 or the wired communication unit 44 transmits the screen data to one of the display apparatuses 20 (the number of pieces of screen data transmitted per second) is referred to as a transmission frame rate.

The communication terminal 40 further includes a registered AP storage unit 49 implemented by, for example, the EEPROM 404, the ROM 402, or the RAM 403 illustrated in FIG. 4. In the registered AP storage unit 49, a list of APs registered in the communication terminal 40 as APs to which the communication terminal 40 is allowed to connect is stored.

FIG. 6 is a diagram illustrating a list of APs registered in the registered AP storage unit 49 according to the present embodiment. The communication terminal 40 cannot connect to any APs other than the APs registered in the registered AP storage unit 49. The registered AP storage unit 49 may be located in, for example, an information technology (IT) system of a company. In the IT system, APs (access points) to which communication terminals of the company are allowed to connect are registered. In this case, the communication terminal 40 inquires of the IT system about the SSID of an AP to which the communication terminal 40 is going to connect, and connects to the AP only when the connection is permitted.

The contents of the registered AP storage unit 49 included in the communication terminal 40 may be downloaded from the IT system. In this case, when it is difficult to make an inquiry to the IT system due to, for example, being outside the company, the communication terminal 40 refers to the registered AP storage unit 49 included in the communication terminal 40. In this way, the communication terminal 40 connects to an AP based on the latest list of registered APs inside the office and can determine whether to connect to an AP based on the list of registered APs outside the office.

In FIG. 6, the SSID is used as the identification information of the AP. Alternatively, for example, a basic service set identifier (BSSID) or the name of the AP may be used.

Functions of Display Apparatus

The display apparatus 20 is described below. The functions of the display apparatus 20 are typically arranged in three layers. The three layers are a hardware control layer 30, an operating system (OS) 27, and a connection application layer 39 in this order from the bottom. Although there are other applications that operate on the OS 27, only the principal applications are described in the present embodiment.

The hardware control layer 30 includes a touch control unit 28, a wireless connection control unit 29, a wired connection control unit 31, a video and audio control unit 32, and a power supply control unit 33. These functions of the hardware control layer 30 may be implemented by, for example, an application or a device driver (an example of a program).

The touch control unit 28 converts a signal input from the touch sensor 102*a* into coordinates (X and Y coordinates with the upper left corner of the display panel 102 as an origin, for example) and outputs the coordinates to the OS 27. The touch control unit 28 may further convert the signal into a touched area or a pressure included in the signal, and output the converted signal to the OS 27.

The wireless connection control unit 29 performs, for example, filtering, amplification, demodulation, and analog to digital (A/D) conversion on radio waves of the wireless communication received by the communication I/F 103 to convert the radio waves into digital signals. Then, the wireless connection control unit 29 decapsulates the digital signals according to the communication protocol and obtain data. The wireless connection control unit 29 outputs the data to the OS 27. This data is video data or audio data transmitted from the communication terminal 40. The wireless connection control unit 29 also obtains data from the OS 27 and performs encapsulation of the data according to the communication protocol, digital to analog (D/A) conversion, modulation, and amplification to convert the data into radio waves. Then, the wireless connection control unit 29 transmits the radio waves of the wireless communication through the communication I/F 103. This data is a touch signal according to an embodiment of the present disclosure.

The wireless connection control unit 29 wirelessly communicates with the other information processing apparatus (communication terminal 40) in the role determined by a determination unit 29*a*. Specifically, the wireless connection control unit 29 has a function to communicate with the communication terminal 40 in accordance with, for example, the MIRACAST specifications.

The wireless connection control unit 29 has a function of an AP according to WI-FI Direct. The AP transmits an own SSID to surrounding devices at regular intervals (SSID broadcast). The AP determines whether the password transmitted by the communication terminal 40 is the same as the password set in advance, and permits (or does not permit) the connection of the communication terminal 40.

The wireless connection control unit 29 includes the determination unit 29*a*. The determination unit 29*a* determines the role based on the setting related to the role changed by a setting changing unit 25. Specifically, the determination unit 29*a* has a function to determine a group owner in a network group using an intent value, which will be described later, based on the MIRACAST specifications.

The wired connection control unit 31 decodes the compressed video data and audio data included in signals received by the USB I/F 105 or the HDMI I/F 111 via the wired cable. The wired connection control unit 31 detects a horizontal synchronization signal and a vertical synchronization signal included in the video data to generate a segment of the scanning line for the video, and outputs the video data for display to the OS 27. The wired connection control unit 31 also obtains data from the OS 27 and transmits the data to the communication terminal 40 from a predetermined pin terminal via the wired cable. This data is another touch signal according to an embodiment of the present disclosure.

The video and audio control unit 32 converts the video data obtained from the OS 27 into a format supported by the display panel 102, such as a red-green-blue (RGB) format, and stores the converted data in a video memory. The video and audio control unit 32 applies a voltage to the individual cells of the display panel 102 according to the video data obtained from the video memory. The video and audio control unit 32 generates a differential signal from the audio data obtained from the OS 27, and outputs the differential signal to the positive terminal and the negative terminal of the speaker.

The power supply control unit 33 controls the power supply from the battery or the power supply from the external power supply in accordance with the shutdown process from the OS 27 or the input status of the power switch of the display apparatus or the external power supply. In the case where surplus power is available from the external power supply, the power supply control unit 33 charges the battery. The power supply control unit 33 manages the amount of the battery. The power supply control unit 33 controls the transition to the power-saving mode and the return from the power-saving mode as some of forms of the power supply control.

The connection application layer 39 includes a first communication unit 21, a second communication unit 22, an operation reception unit 23, an output unit 24, the setting change unit 25, and a connection list management unit 26. These functional units included in the connection application layer 39 provide functions implemented by the CPU of the controller 101 executing instructions included in the connection application layer 39 (an example of a program).

The first communication unit 21 receives video data and audio data via the wired connection control unit 31, and transmits the video data and the audio data to the output unit 24. Also, the first communication unit 21 transmits the touch signal received by the operation reception unit 23 via the wired connection control unit 31 to the communication terminal 40.

The second communication unit 22 transmits the SSID and the password of the display apparatus 20 to the wireless connection control unit 29 to instruct the wireless connection control unit 29 to start, maintain, or terminate the wireless communication with the communication terminal 40. The second communication unit 22 receives video data and audio data via the wireless connection control unit 29, and transmits the video data and the audio data to the output unit 24. Also, the second communication unit 22 transmits the touch signal received by the operation reception unit 23 via the wireless connection control unit 29 to the communication terminal 40. The second communication unit 22 can communicate directly with the communication terminal 40 or can communicate with the communication terminal 40 via an ordinary access point.

The operation reception unit 23 receives a change of the setting relating to the role on a screen caused to be displayed by the output unit 24. Specifically, the operation reception unit 23 receives a setting set on a multiple-device simultaneous connection setting screen. Also, the operation reception unit 23 receives a touch operation on a video input from the communication terminal 40 and a touch operation on an icon. In the case where the coordinates of the touched position are in the area of the circumscribed rectangle of the icon, the operation reception unit 23 receives the pressing of the icon. In the case where the coordinates of the touched position are not in the area of the circumscribed rectangle of the icon but in the display area of the video, the operation reception unit 23 receives the operation (such as handwriting input or a button operation) to the communication terminal 40. The coordinates of the touched position in the display area of the video are transmitted to the communication terminal 40 as a touch signal. The coordinates of the touched position in the area of the circumscribed rectangle of the icon are received as an operation to the display apparatus 20.

In the case of the operation to the communication terminal 40, the first communication unit 21 or the second communication unit 22 transmits the touch signal to the communication terminal 40. The touch signal in this case is a signal obtained by converting the coordinates of the touched position on the display apparatus 20 into coordinates in an effective pixel region of the display 418 of the communication terminal 40. The converted coordinates are expressed, for example, as a ratio of the X coordinate to the width and a ratio of the Y coordinate to the height of the video (image) displayed on the display apparatus 20.

The output unit 24 causes a screen for receiving a setting relating to the role to be displayed. Specifically, the output unit 24 has a function to cause the multiple-device simultaneous connection setting screen to be displayed. The output unit 24 obtains at least one of the video data and the audio data received by the first communication unit 21 or the second communication unit 22 from the communication terminal 40, and controls the output of the video data or the audio data from the video and audio control unit 32. The output unit 24 displays the video input from the communication terminal 40 on the display layer for displaying a source video and outputs the audio from the speaker 109.

The setting change unit 25 changes the setting relating to the role when the display apparatus 20 wirelessly communicates with the communication terminal 40 in accordance with the operation performed by the operator. Specifically, the setting changing unit 25 changes the intent value according to settings relating to the multiple-device simultaneous connection set by the operator. One of the settings relating to the multiple-device simultaneous connection is whether the operator has set the multiple-device simultaneous connection to "permit" or "not permit." The setting change unit 25 changes the intent value depending on whether the multiple-device simultaneous connection is set to "permit" or "not permit" (see FIG. 15). When the connection is unsuccessful, the setting change unit 25 changes the setting of the multiple-device simultaneous connection (multiple-device simultaneous connection setting) to "not permit."

The setting change unit 25 changes the intent value based on the multiple-device simultaneous connection setting associated with the communication terminal 40 in a connection list to be described later. When the connection is unsuccessful, the setting change unit 25 changes or newly registers the multiple-device simultaneous connection setting for the communication terminal 40 to "not permit" in the connection list.

The connection list management unit 26 manages the connection list that is a list of the communication terminals 40 to which the display apparatus 20 was successfully connected in the past. In the connection list, the multiple-device simultaneous connection setting ("permit" or "not permit") set by the operator or the multiple-device simultaneous connection setting ("not permit") automatically switched is set in association with the communication terminal 40 (see FIG. 7).

FIG. 7 is a diagram illustrating the connection list stored in a connection list storage unit 38 according to the present embodiment. This connection list is managed by the connection list management unit 26. The connection list is a list of the communication terminals 40 to which the display apparatus 20 was successfully connected in the past. In the present embodiment, the connection list management unit 26 records a list of the communication terminals 40 to which the display apparatus 20 has previously been connected, and records the setting on a multiple-device simultaneous connection setting screen 210 in association with each communication terminal 40 recorded in the connection list.

For example, in FIG. 7, when the communication terminals 40 of "ABCDE," "FGHIJ," and "PQRST" were connected, the multiple-device simultaneous connection was set to "not permit" in the display apparatus 20. When the communication terminal 40 of "KLMNO" was connected, the multiple-device simultaneous connection was set to "permit" in the display apparatus 20. This indicates that the communication terminals 40 of "ABCDE," "FGHIJ," and "PQRST" may be allowed to connect only to the registered APs, and that the multiple-device simultaneous connection may need to be set to "not permit" in order for the display apparatus 20 to connect to these communication terminals 40.

When the display apparatus 20 connects to the communication terminal 40 recorded in the connection list, the setting change unit 25 automatically switches the multiple-device simultaneous connection setting to the setting stored in the connection list storage unit 38. In this way, the optimal setting is set without the operator making the setting on the multiple-device simultaneous connection setting screen 210 each time a connection is made.

Case of Simultaneous Connection

FIG. 8 is a diagram illustrating a configuration in which multiple communication terminals 40 are connected to the display apparatus 20, according to the present embodiment. When the multiple communication terminals 40 are connected to the display apparatus 20, the display apparatus 20 plays a group owner. As will be described later, which of the display apparatus 20 and the communication terminals 40 plays the group owner is determined by the intent value. The intent value of the display apparatus 20 to which the multiple communication terminals 40 may be connected is conventionally set to a high value (e.g., 8 to 15) in advance.

Figure 9:
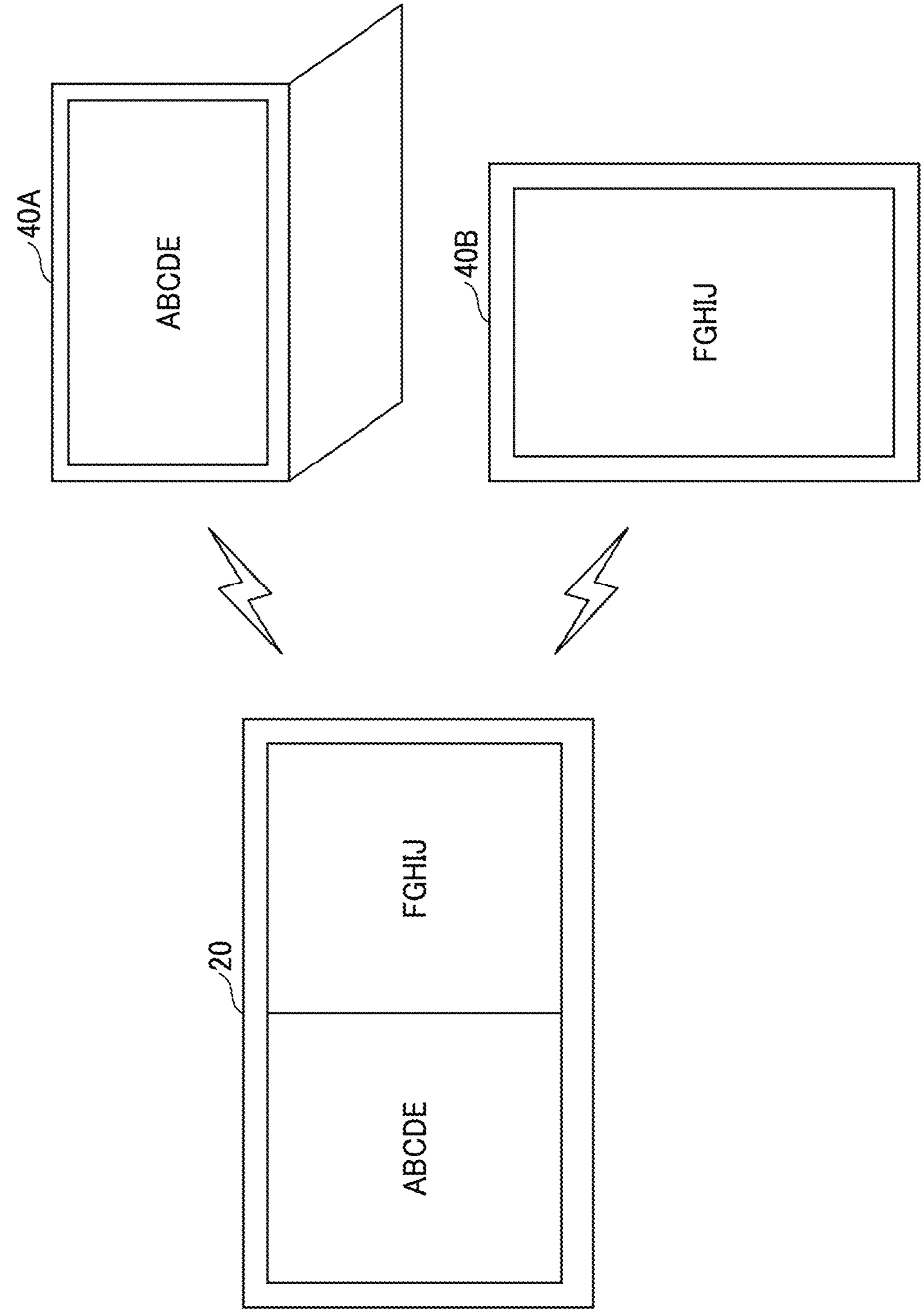
FIG. 9 is a diagram illustrating a screen configuration displayed by a display apparatus connected to multiple communication terminals, according to an embodiment of the present disclosure.

FIG. 9 is a diagram illustrating a screen configuration displayed by the display apparatus 20 connected to the multiple communication terminals 40, according to the present embodiment. When the multiple communication terminals 40 are connected to a single display apparatus 20, the display apparatus 20 can simultaneously display videos (images) from communication terminals 40A and 40B picture by picture (side by side) as illustrated in FIG. 9. The display apparatus 20 can simultaneously display two videos (images) in a manner of picture in picture in addition to picture by picture.

Restriction of Connection to AP of Communication Terminal

Figure 10:
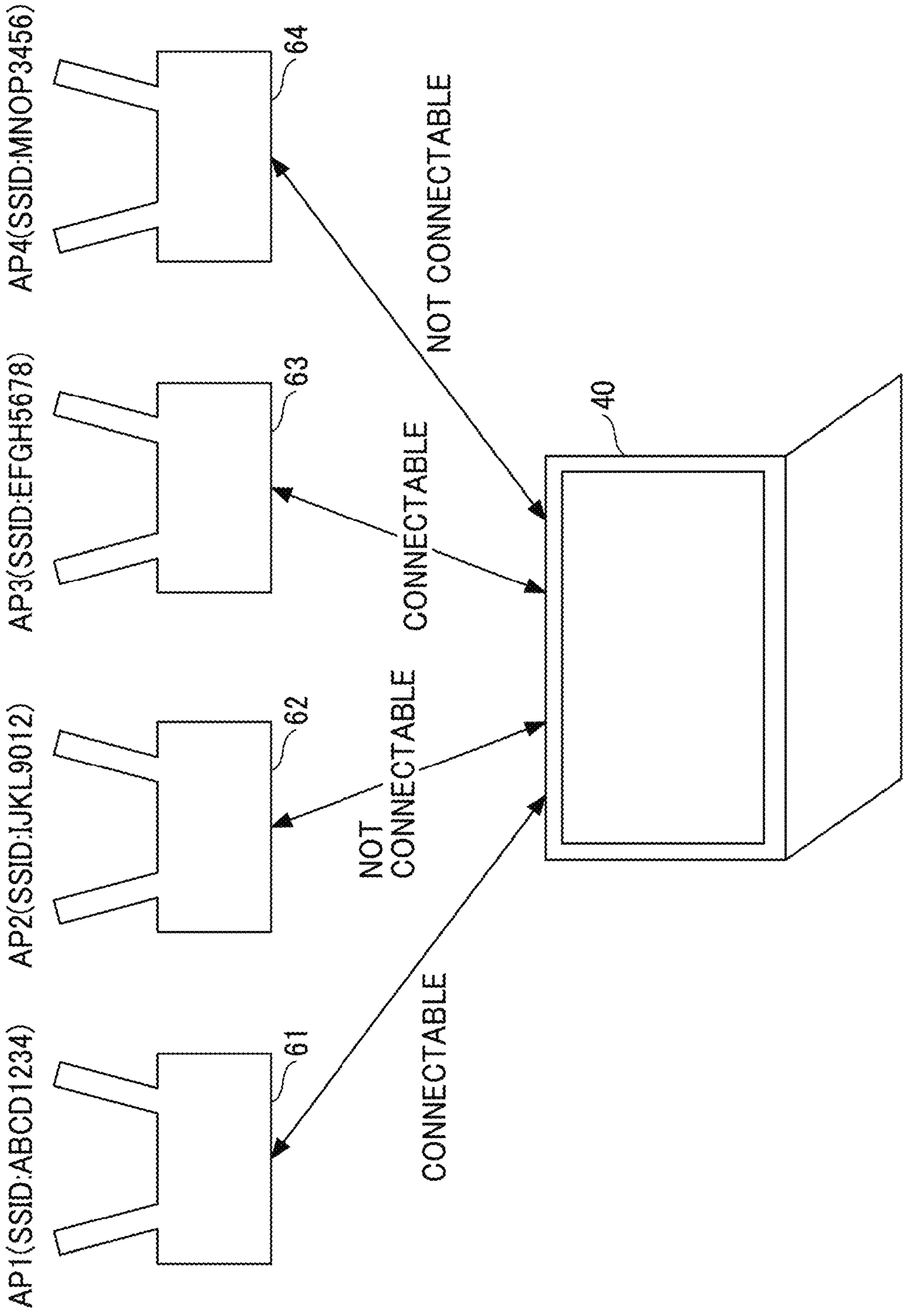
FIG. 10 is a diagram illustrating APs to which a communication terminal is restricted from connecting, according to an embodiment of the present disclosure.

FIG. 10 is a diagram illustrating APs to which the communication terminal 40 is restricted from connecting, according to the present embodiment. In the registered AP storage unit 49 illustrated in FIG. 6, "ABCD1234" and "EFGH5678" are registered as APs to which the communication terminal 40 is allowed to connect. In FIG. 10, APs 61 to 64 having SSIDs of "ABCD1234," "IJKL9012," "EFGH5678," and "MNOP3456," respectively, exist around the communication terminal 40.

Since the communication terminal 40 is set to operate in accordance with the IT policy of the company, the communication terminal 40 is prohibited from connecting to any APs other than the registered APs. Accordingly, the communication terminal 40 can connect to the APs 61 and 63 having the SSIDs of "ABCD1234" and "EFGH5678," respectively, but cannot connect to the APs 62 and 64 having the SSIDs of "IJKL9012" and "MNOP3456," respectively.

Figure 11A:
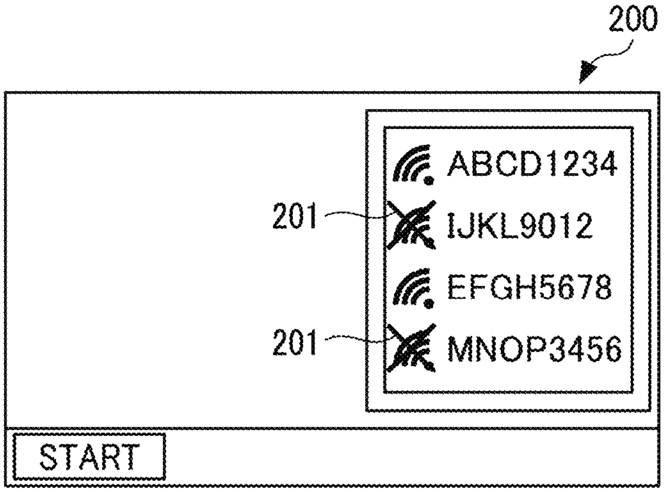
FIGS. 11A and 11B are diagrams each illustrating a network list screen displayed by a communication terminal according to an embodiment of the present disclosure.
Figure 11B:
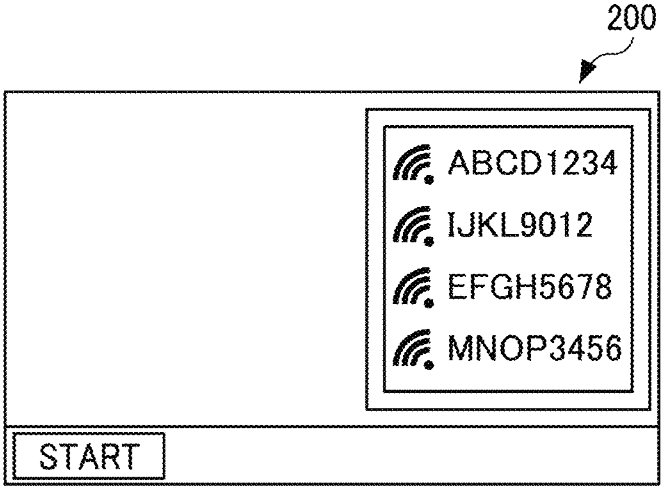

FIGS. 11A and 11B are diagrams each illustrating a network list screen 200 displayed by the communication terminal 40 according to the present embodiment. In the case of a WINDOWS PC, the network list screen 200 is displayed by simultaneously pressing the WINDOWS key and the K key.

The communication terminal 40 set to operate in accordance with the IT policy of the company displays the network list screen 200 illustrated in FIG. 11A. In the network list screen 200 illustrated in FIG. 11A, cross marks 201 are displayed over the networks (APs) that are not registered as networks to which the communication terminal 40 is allowed to connect. Thus, the network list screen 200 clearly indicates that the networks over which the cross marks are displayed cannot be connected to. A cross mark 201 is given by way of example. In another embodiment, an AP that is not registered as a network to which the communication terminal 40 is allowed to connect may not be displayed.

The communication terminal 40 not set to operate in accordance with the IT policy of the company displays the network list screen 200 illustrated in FIG. 11B. In the network list screen 200 illustrated in FIG. 11B displayed by the communication terminal 40 located in the same place where the communication terminal 40 of FIG. 11A is located, no networks to which the cross marks 201 are attached are displayed since the communication terminal 40 of FIG. 11B is not prohibited from connecting to any APs other than the registered APs.

In either case of FIG. 11A or 11B, when the operator selects a network (AP), the communication terminal 40 starts a connection process.

Process at Time of Communication

Figure 12A:
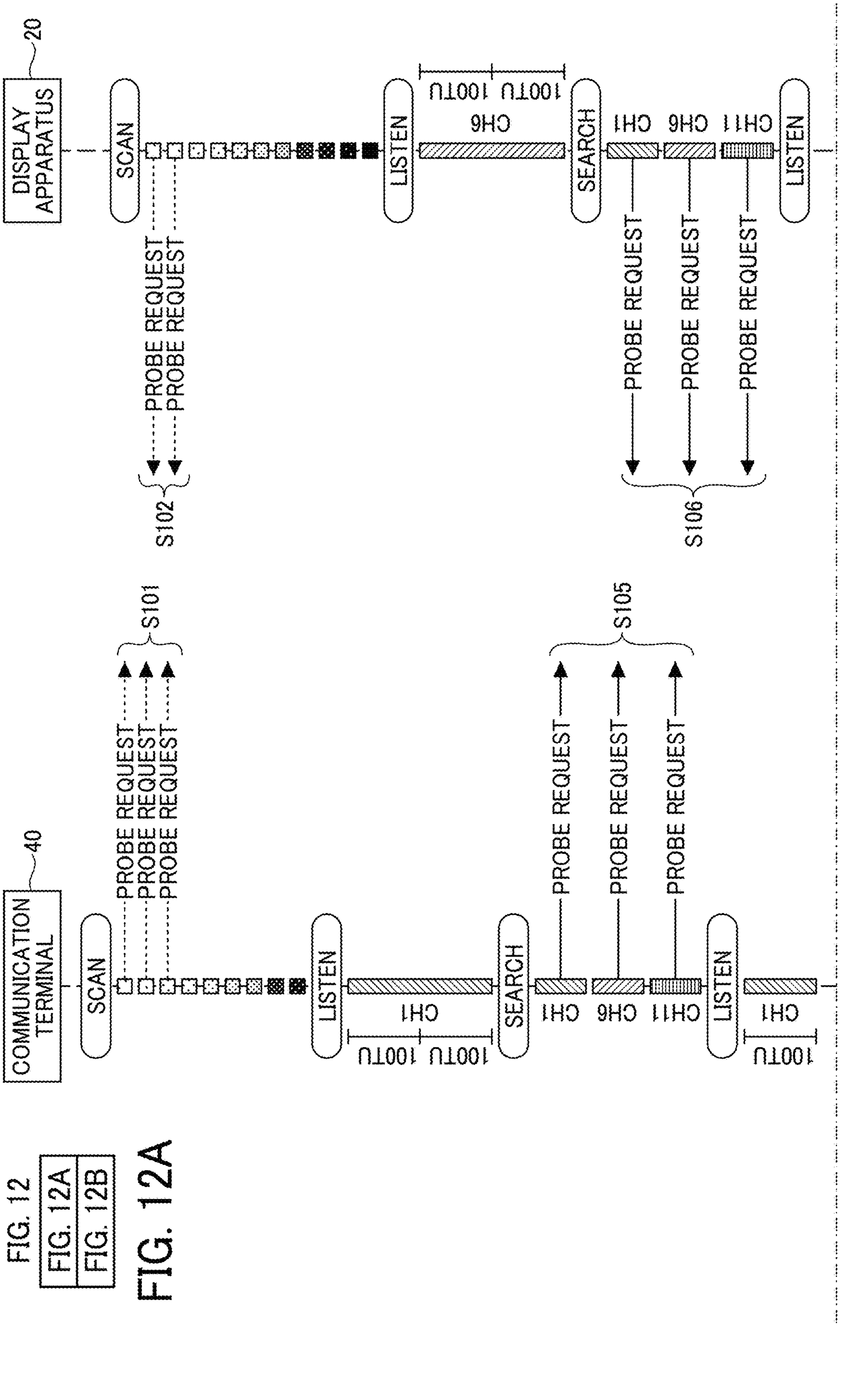
FIG. 12 (FIGS. 12A and 12B) is a sequence chart illustrating a process in which a communication terminal and a display apparatus connect to each other according to an embodiment of the present disclosure.
Figure 12B:
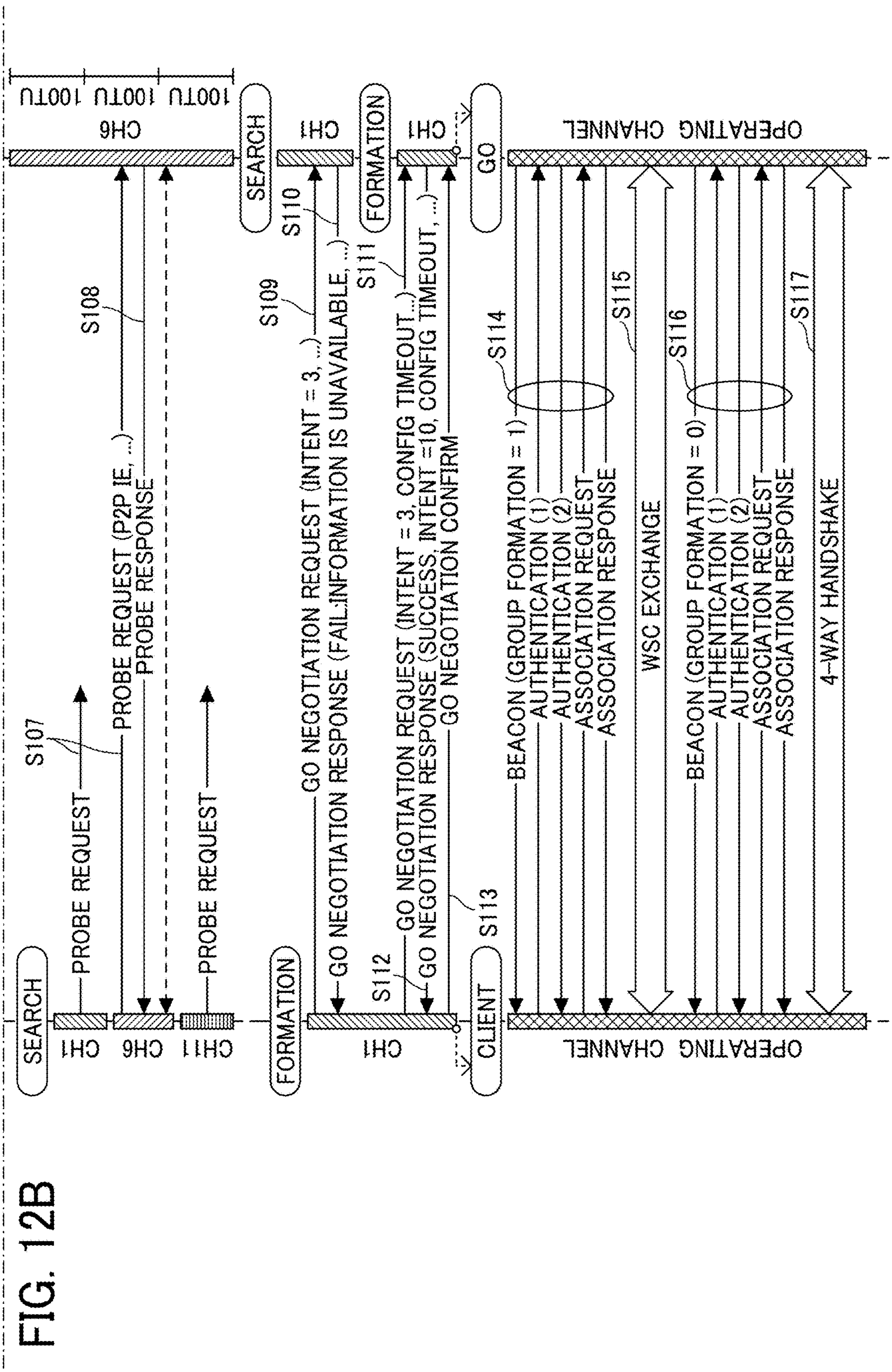

A process in which the communication terminal 40 and the display apparatus 20 connect to each other is described below with reference to FIG. 12 (FIGS. 12A and 12B). FIG. 12 (FIGS. 12A and 12B) is a sequence chart illustrating a process in which the communication terminal 40 and the display apparatus 20 connect to each other according to the present embodiment. In FIG. 12, the roles of the communication terminal 40 and the display apparatus 20 may be reversed.

S101: In a scan phase, the communication terminal 40 transmits a probe request (request for a response from the display apparatus 20) to the display apparatus 20.

S102: Similarly, in a scan phase, the display apparatus 20 transmits a probe request (request for a response from the communication terminal 40) to the communication terminal 40.

S103: After the scan phase, the communication terminal 40 enters a listen phase for waiting for a response for a certain period of time. The channel at this time is assumed to be set to 1.

S104: After the scan phase, the display apparatus 20 enters a listen phase for waiting for a response for a certain period of time. The channel at this time is assumed to be set to 6.

S105: The communication terminal 40 enters a search phase and transmits a probe request on channels 1, 6, and 11, respectively.

S106: Similarly, the display apparatus 20 enters a search phase and transmits a probe request on the channels 1, 6, and 11, respectively.

S107: It is assumed that the communication terminal 40 is in the search phase and the display apparatus 20 is in the listen phase. The communication terminal 40 transmits a probe request on the channels 1 and 6 in order.

S108: Since the display apparatus 20 is in the listen phase on the channel 6, the display apparatus 20 receives the probe request on the channel 6. The display apparatus 20 responds to a device 1 with a probe response.

S109: In response to the response, the communication terminal 40 enters a network formation phase, and the communication terminal 40 requests negotiation with the display apparatus 20 (also transmits the intent value "3").

S110: The display apparatus 20 responds to the request for the negotiation, but it is assumed that the response is unsuccessful at this point.

S111: The communication terminal 40 again requests the negotiation with the display apparatus 20.

S112: The display apparatus 20 responds to the request for the negotiation, and it is assumed that the response is successful at this point (also transmits the intent value "10").

S113: Both apparatuses start the negotiation. In this case, since the intent value of the communication terminal 40 is smaller than that of the display apparatus 20, the communication terminal 40 plays the client. The display apparatus 20 plays the group owner.

S114: The display apparatus 20 and the communication terminal 40 authenticate each other, and exchange information used for forming a network group.

S115: A WI-FI simple configuration (WSC) is exchanged between the display apparatus 20 and the communication terminal 40.

S116: The display apparatus 20 and the communication terminal 40 authenticate each other, and exchange information used for forming the network group.

S117: A four-way handshake (authentication procedure) is performed between the display apparatus 20 and the communication terminal 40. Through the process described above, the connection between the display apparatus 20 and the communication terminal 40 is completed, and video transmission from the communication terminal 40 to the display apparatus 20 is performed.

Figure 13:
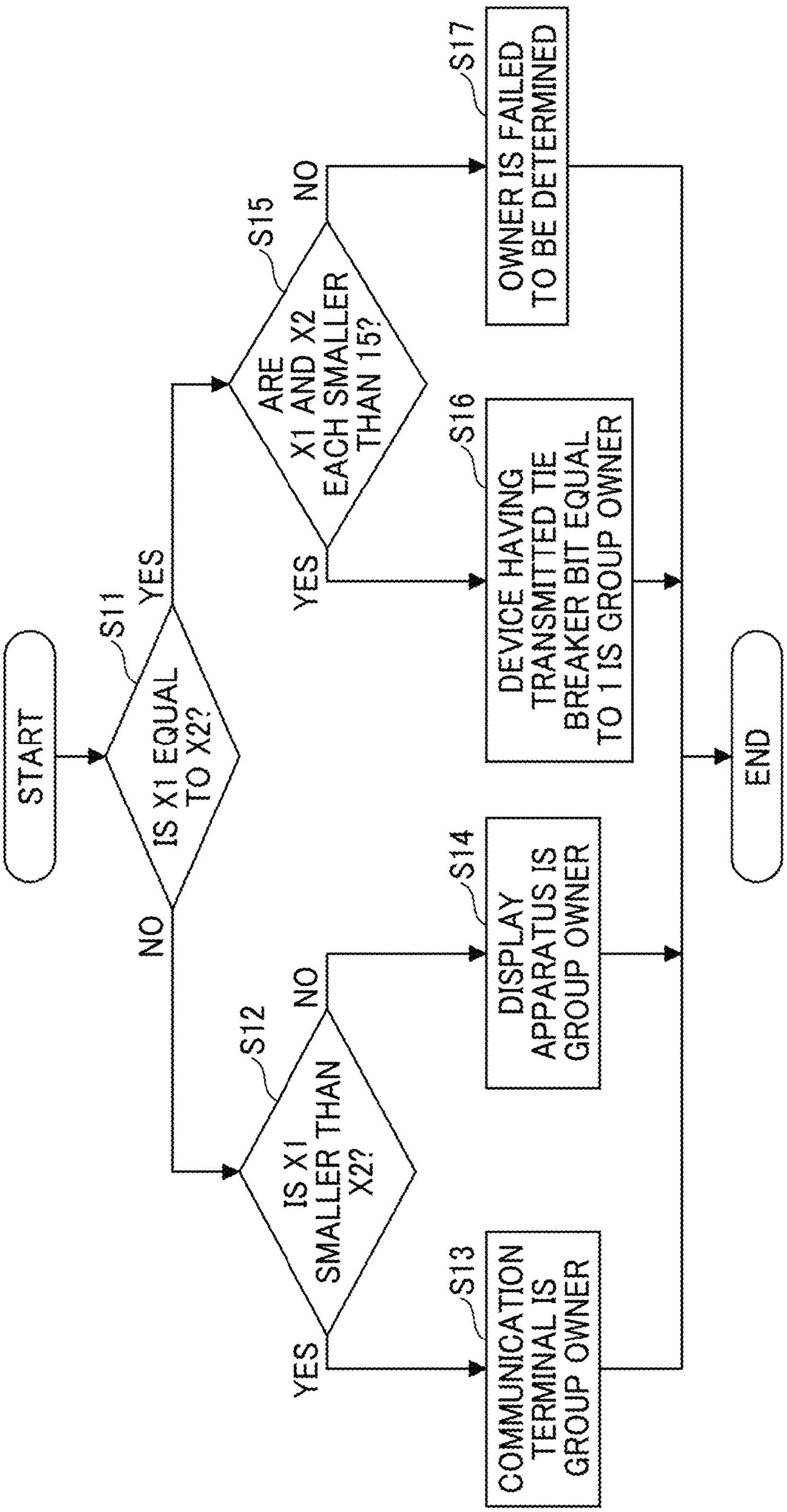
FIG. 13 is a flowchart of a process in which a determination unit determines a group owner of a network in negotiation according to an embodiment of the present disclosure.

FIG. 13 is a flowchart of a process in which the determination unit 29*a* determines a group owner of a network in negotiation according to the present embodiment. As described with reference to FIG. 12, a network formation process starts when a certain device transmits a probe request and another device responds to the request with a probe response. In the network formation process, group owner negotiation (negotiation to determine a group owner) is performed. In FIG. 13, a process in which a device having an intent value greater than that of another device is determined to be a group owner is illustrated. In the description of FIG. 13, the intent value of the display apparatus 20 is designated as X1, and the intent value of the communication terminal 40 is designated as X2.

The determination unit 29*a* compares X2 received from the communication terminal 40 with X1 of the display apparatus 20 (own apparatus), and determines whether X1 is equal to X2 (S11).

In the case where X1 is determined not to be equal to X2 (NO in S11), the determination unit 29*a* determines whether X1 is smaller than X2 (S12).

In the case where X1 is determined to be smaller than X2 (YES in S12), the determination unit 29*a* determines that the communication terminal 40 is the group owner (S13). The determination unit 29*a* determines that the display apparatus 20 is a client.

In the case where X1 is determined not to be smaller than X2 (NO in S12), the determination unit 29*a* determines that the display apparatus 20 is the group owner (S14). The communication terminal 40 is determined to be another client different from the display apparatus 20 that is determined to be a client.

In the case where X1 is determined to be equal to X2 (YES in S11), the determination unit 29*a* determines whether X1 and X2 are each smaller than 15 (S15).

In the case where X1 and X2 are determined to be each smaller than 15 (YES in S15), the determination unit 29*a* determines that the device that has transmitted the tie breaker bit equal to one (the value referred to when the intent values are equal) is the group owner (S16).

In the case where X1 and X2 are both determined to be 15 (NO in S15), the determination unit 29*a* determines that the determination of the group owner is unsuccessful (S17). In this case, the network formation is terminated (the connection is unsuccessful).

As described above, the group owner is determined by the intent value. In order for the communication terminal 40 that is allowed to connect only to the registered APs to connect to the display apparatus 20, it is sufficient that the intent value of the display apparatus 20 is set so that the communication terminal 40 is determined to be the group owner.

Setting of Intent Value

In the present embodiment, a setting as to whether to permit the display apparatus 20 to be simultaneously connected to multiple devices is associated with the intent value.

FIGS. 14A and 14B are diagrams each illustrating the multiple-device simultaneous connection setting screen 210 displayed by the display apparatus 20 according to the present embodiment. The multiple-device simultaneous connection setting screen 210 may be displayed over the video on the display screen illustrated in FIG. 9 or may be displayed on the video in a pop-up manner. The multiple-device simultaneous connection setting screen 210 may be displayed on the same screen where the video is displayed, or may be caused to be displayed by an application different from the application for displaying the video. The multiple-device simultaneous connection setting screen 210 is caused to be displayed by an application installed in the display apparatus 20. The multiple-device simultaneous connection setting screen 210 includes a radio button corresponding to “permit” 211 to permit the multiple-device simultaneous connection and a radio button corresponding to “not permit” 212 not to permit the multiple-device simultaneous connection. This setting set on the multiple-device simultaneous connection setting screen 210 applies to simultaneous connection of two or more devices. In FIG. 14A, a case where the “not permit” 212 is selected is illustrated. In FIG. 14B, a case where the “permit” 211 is selected is illustrated. The setting change unit 25 can change the intent value according to the setting set on the multiple-device simultaneous connection setting screen 210.

FIG. 15 is a diagram illustrating the correspondence between a multiple-device simultaneous connection setting and an intent value according to the present embodiment. As illustrated in FIG. 15, when the multiple-device simultaneous connection setting is set to “permit,” the intent value is set to 15 (the maximum value). Similarly, when the multiple-device simultaneous connection setting is set to “not permit,” the intent value is set to “0” (the minimum value). The setting change unit 25 holds information regarding the correspondence between the multiple-device simultaneous connection setting and the intent value as illustrated in FIG. 15, and changes the intent value according to the multiple-device simultaneous connection setting. “0” and “15” are the minimum value and the maximum value in the MIRACAST specifications, respectively. A value that is likely or unlikely to be determined to be the group owner may be set as the intent value in accordance with the standard of the MIRACAST specifications. The intent value may be changed to “14” when the multiple-device simultaneous connection setting is set to “permit,” or the intent value may be changed to “1” when the multiple-device simultaneous connection setting is set to “not permit.”

Figure 16:
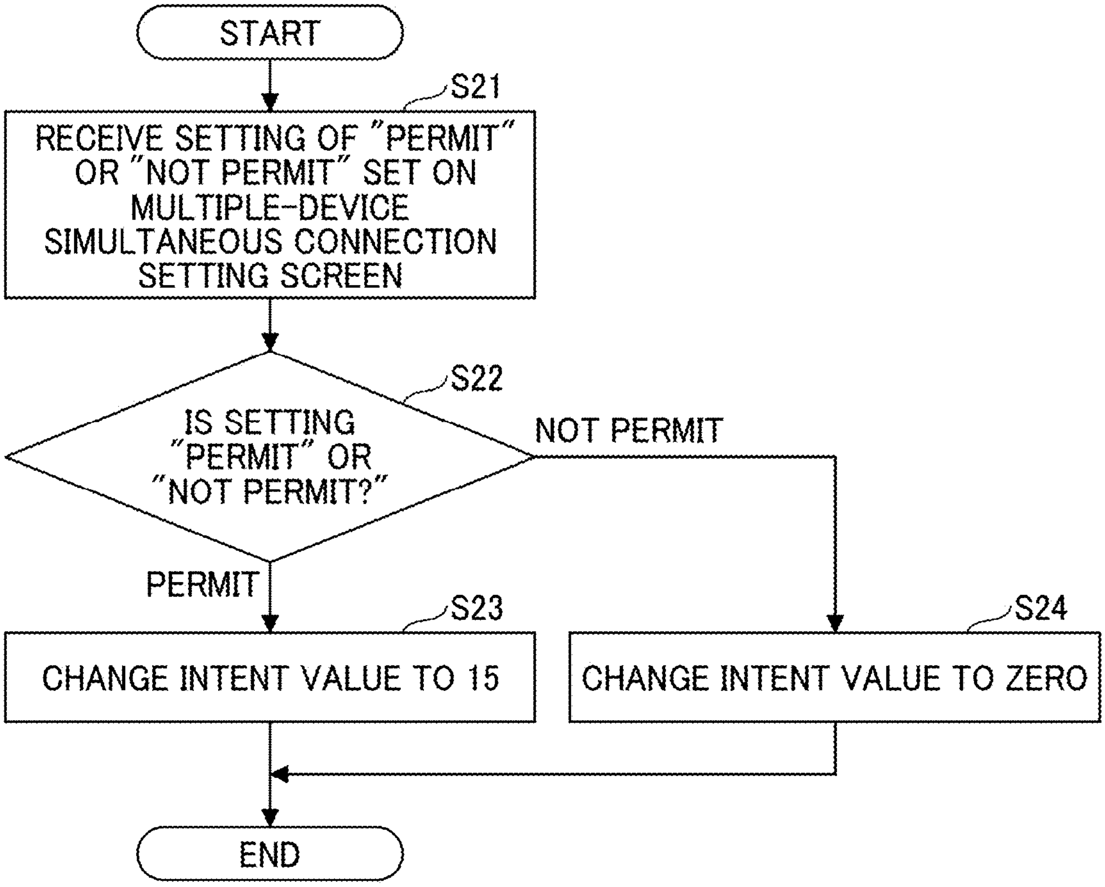
FIG. 16 is a flowchart of a process in which a setting change unit changes an intent value according to an embodiment of the present disclosure.

FIG. 16 is a flowchart of a process in which the setting change unit 25 changes an intent value according to the present embodiment.

As illustrated in FIG. 14A and FIG. 14B, the operation reception unit 23 receives the setting of “permit” or “not permit” set on the multiple-device simultaneous connection setting screen 210 (S21).

The setting change unit 25 determines whether “permit” or “not permit” is set (S22).

In the case where “permit” is determined to be set (“permit” in S22), it is interpreted that the operator intends to set the display apparatus 20 as the group owner. Accordingly, the setting change unit 25 sets the intent value of the display apparatus 20 to “15” (the maximum value) (S23).

In the case where “not permit” is determined to be set (“not permit” in S22), it is interpreted that the operator intends to set the display apparatus 20 as a client. Accordingly, the setting change unit 25 sets the intent value of the display apparatus 20 to “0” (the minimum value) (S24).

Techniques in the related art have an issue that an information processing apparatus cannot be connected to another information processing apparatus in some cases. For example, a personal computer (PC) used in a company, which serves as the other information processing apparatus, is often set so as not to be allowed to connect to access points other than specific access points (access points registered on the PC, such as the access points within the company to which the operator belongs). On the other hand, the group owner has a function similar to that of an access point. Consequently, when the information processing apparatus plays the group owner and the other information processing apparatus attempts to connect to the information processing apparatus, the other information processing apparatus may be restricted from connecting to the information processing apparatus since the information processing apparatus is not registered as an access point.

By the operator setting "not permit" on the multiple-device simultaneous connection setting screen 210, the intent value of the display apparatus 20 is set to "0." Thus, the possibility that the communication terminal 40 is determined to be the group owner increases. Since the display apparatus 20 is determined to be a client, the display apparatus 20 can transmit and receive video and audio by connecting to the AP provided by the communication terminal 40. On the other hand, by the operator setting "permit" on the multiple-device simultaneous connection setting screen 210, the intent value of the display apparatus 20 is set to "15." Thus, the possibility that the display apparatus 20 is determined to be the group owner increases. As a result, the display apparatus 20 can receive video and audio from multiple clients and output the video and the audio.

The intent value in the case where the setting is set to "not permit" does not necessarily have to be "0." Since the display apparatus 20 and the communication terminal 40 exchange the intent values in the connection process, it is sufficient that the intent value of the display apparatus 20 is set to a value smaller than the intent value of the communication terminal 40. Similarly, the intent value in the case where the setting is set to "permit" does not necessarily have to be "15." Since the display apparatus 20 and the communication terminal 40 exchange the intent values in the connection process, it is sufficient that the intent value of the display apparatus 20 is set to a value greater than the intent value of the communication terminal 40.

Connection Process

Figure 17:
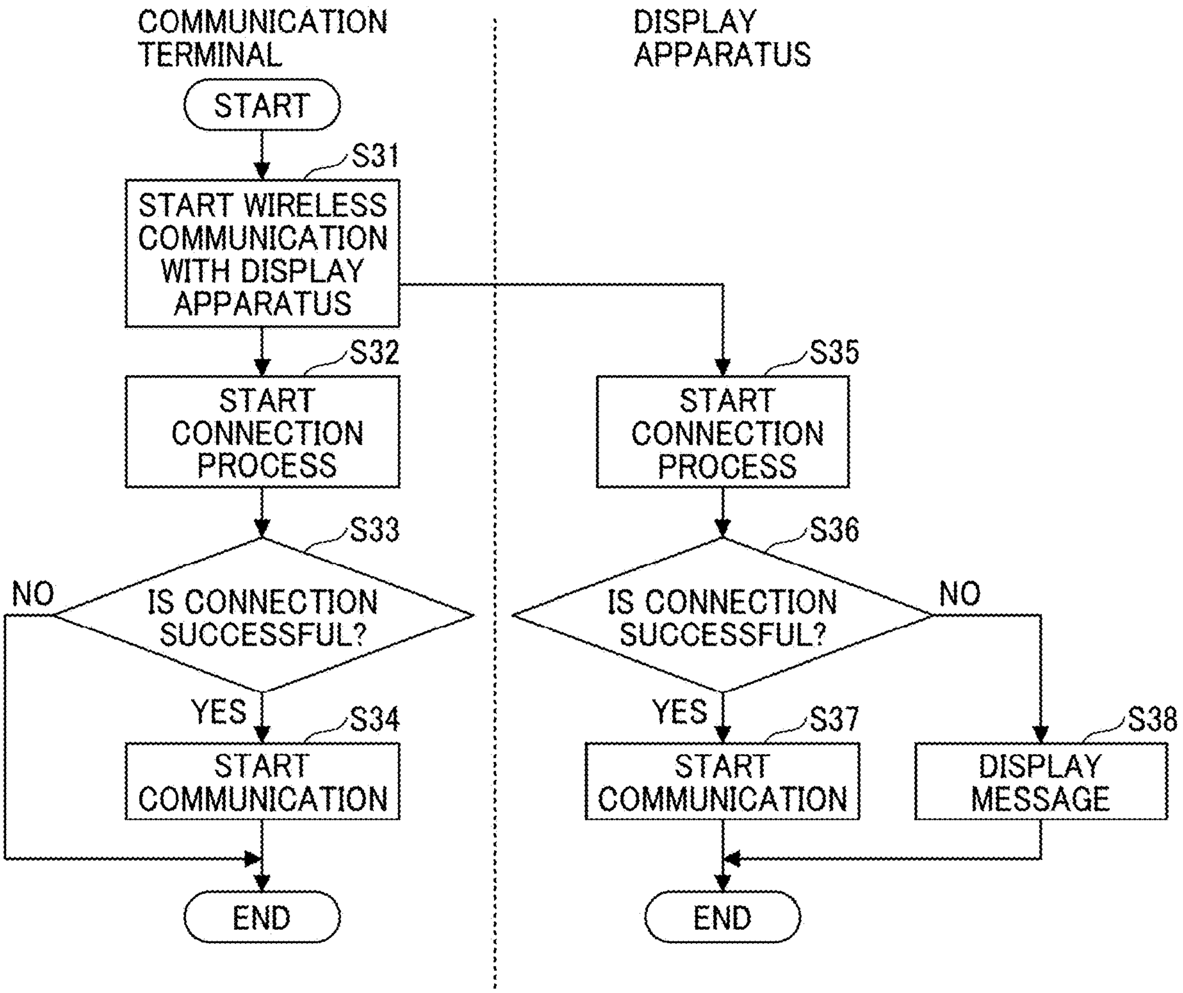
FIG. 17 is a flowchart of a process in which a communication terminal and a display apparatus connect to each other according to an embodiment of the present disclosure.

FIG. 17 is a flowchart of a process in which the communication terminal 40 and the display apparatus 20 connect to each other according to the present embodiment.

The process executed by the communication terminal 40 is described below. The operator causes the network list screen 200 to be displayed and selects an AP representing the display apparatus 20. The wireless communication unit 45 of the communication terminal 40 starts connection with the AP selected by the operator (S31).

The wireless communication unit 45 executes the process illustrated in FIG. 12 (S32). Through the process of FIG. 12, the display apparatus 20 either succeeds or fails in connection. In the case where the connection is successful, the group owner is also determined.

In the case where the connection is successful (YES in S33), the wireless communication unit 45 starts transmission of video and audio (S34). The communication terminal 40 communicates with the display apparatus 20 in a role different from that of the display apparatus 20. In the case where the connection is unsuccessful (NO in S33), the wireless communication unit 45 ends the process.

The process executed by the display apparatus 20 is described below. The wireless connection control unit 29 of the display apparatus 20 executes the process illustrated in FIG. 12 (S35). Note that the setting change unit 25 has already changed the intent value of the display apparatus 20 to the value set on the multiple-device simultaneous connection setting screen 210. Through the process of FIG. 12, the display apparatus 20 either succeeds or fails in connection. In the case where the connection is successful, the group owner is also determined.

In the case where the connection is successful (YES in S36), the wireless connection control unit 29 starts receiving video and audio (S37).

In the case where the connection is unsuccessful (NO in S36), the output unit 24 causes a pop-up message for prompting the operator to change the setting of the multiple-device simultaneous connection setting screen 210 to be displayed (S38).

Figure 18:
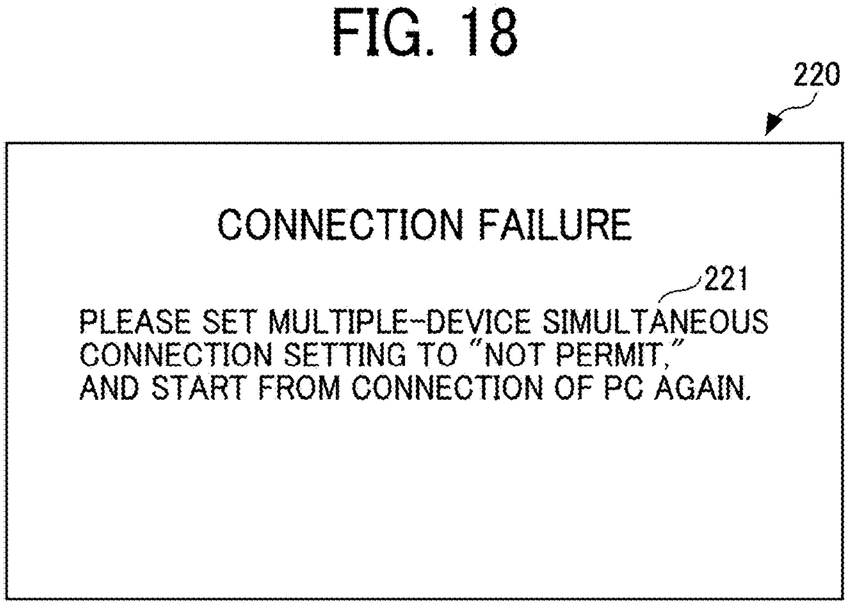
FIG. 18 is a diagram illustrating a pop-up screen displayed by a display apparatus in the case of a connection failure according to an embodiment of the present disclosure.

FIG. 18 is a diagram illustrating a pop-up screen 220 displayed by the display apparatus 20 in the case of a connection failure according to the present embodiment. On the pop-up screen 220 of FIG. 18, a message 221 that indicates "Please set the multiple-device simultaneous connection setting to "not permit," and start from connection of PC again." is displayed. When having viewed the message 221, the operator can cause the multiple-device simultaneous connection setting screen 210 to be displayed and the setting of "not permit" to be set. At the connection next time, the possibility that the display apparatus 20 is connected to the communication terminal 40 increases. The operator can cause the communication terminal 40 to display a list of APs and start the connection again.

Automatic Switching of Multiple-Device Simultaneous Connection Setting in Case of Connection Failure When a connection failure (an interruption of the connection process) is detected, the setting change unit 25 may automatically switch the multiple-device simultaneous connection setting to "not permit." Thus, the time and effort required for the operator to change the multiple-device simultaneous connection setting is eliminated. In this way, at the connection next time, the possibility that the display apparatus 20 is connected to the communication terminal 40 increases.

Figure 19:
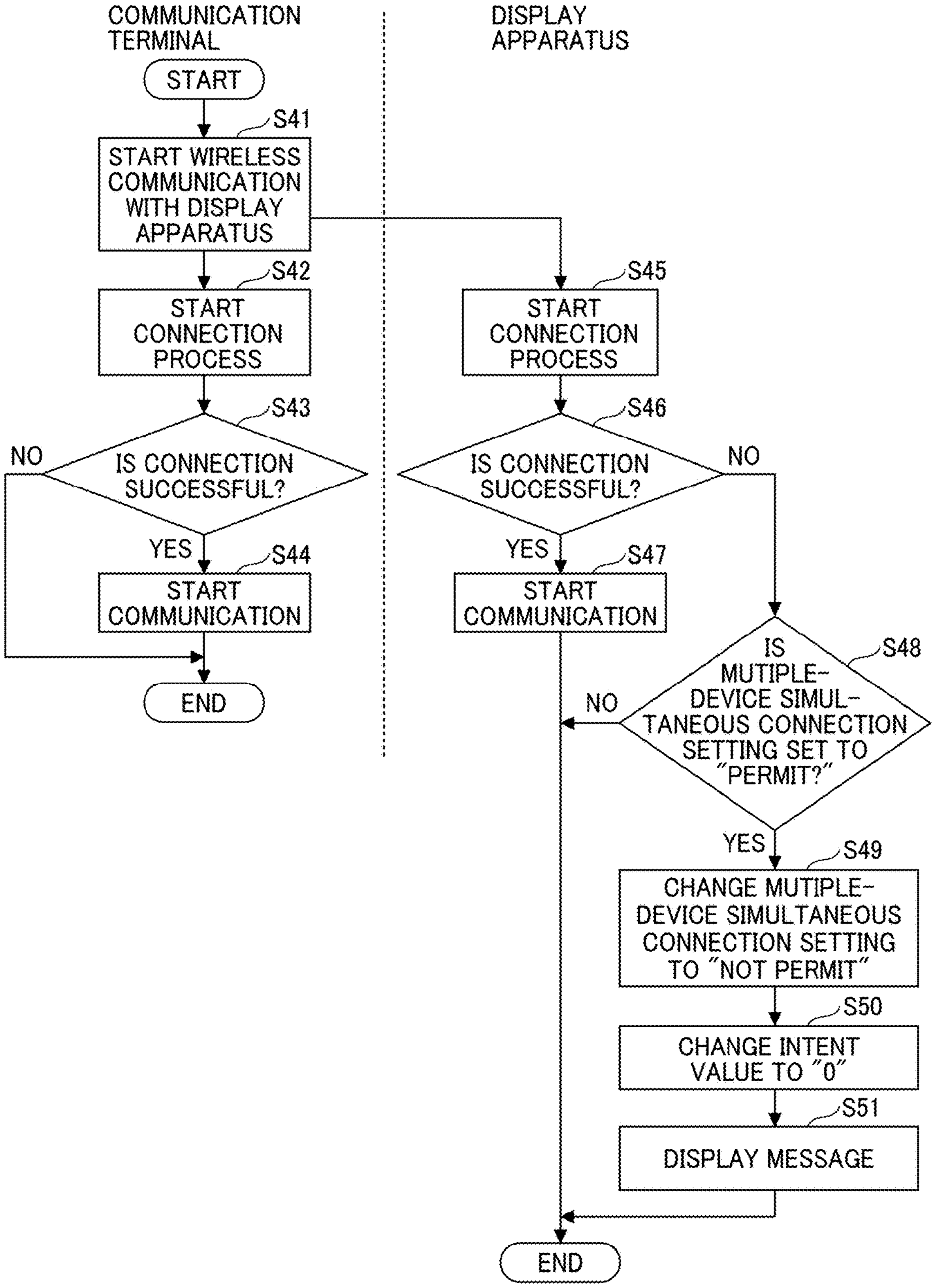
FIG. 19 is a flowchart of a process in which a setting change unit changes a multiple-device simultaneous connection setting when a display apparatus fails to be connected to a communication terminal, according to an embodiment of the present disclosure.

FIG. 19 is a flowchart of a process in which the setting change unit 25 changes the multiple-device simultaneous connection setting when the display apparatus 20 fails to be connected to the communication terminal 40, according to the present embodiment. The process from S41 to S47 may be similar to that from S31 to S37 in FIG. 17.

In the case where the connection is unsuccessful in step S46 (NO in S46), the setting change unit 25 determines whether the multiple-device simultaneous connection setting is set to "permit" (S48). In the case where the multiple-device simultaneous connection setting is determined to be set to "not permit" (NO in S48), the process executed by the display apparatus 20 ends since the multiple-device simultaneous connection setting is already set to "not permit."

In the case where the multiple-device simultaneous connection setting is determined to be set to "permit" (YES in S48), the setting change unit 25 changes the multiple-device simultaneous connection setting to "not permit" (S49).

Since "not permit" is set, the setting change unit 25 changes the intent value of the display apparatus 20 to "0" (S50).

The output unit 24 causes a pop-up message indicating that the multiple-device simultaneous connection setting has been changed and prompting the operator to perform the connection process again to be displayed (S51).

Figure 20:
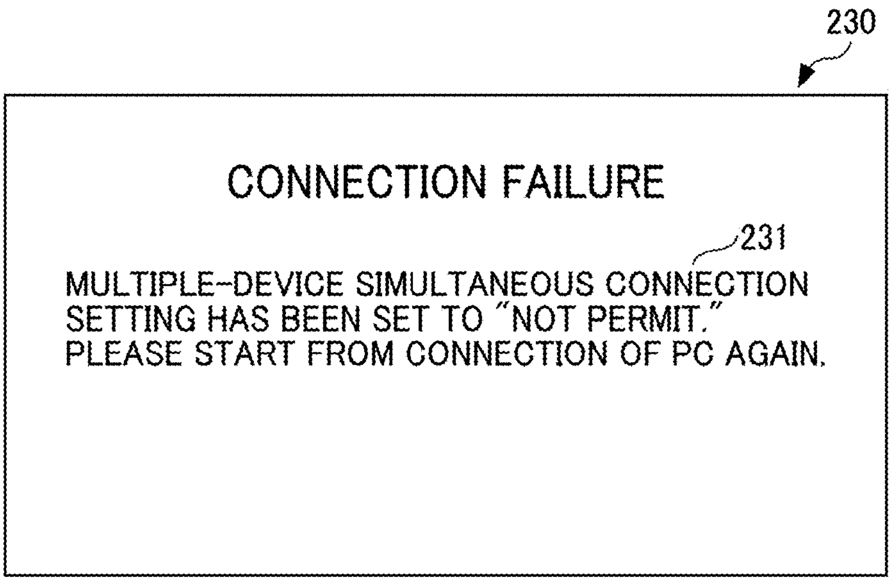
FIG. 20 is a diagram illustrating a pop-up screen displayed by a display apparatus when a multiple-device simultaneous connection setting is changed, according to an embodiment of the present disclosure.

FIG. 20 is a diagram illustrating a pop-up screen 230 displayed by the display apparatus 20 when the multiple-device simultaneous connection setting is changed, according to the present embodiment. On the pop-up screen 230 of FIG. 20, a message 231 that indicates "The multiple-device simultaneous connection setting has been set to "not permit." Please start from connection of PC again." is displayed. At the connection next time, the possibility that the display apparatus 20 is connected to the communication terminal 40 increases. The operator can cause the communication terminal 40 to display a list of APs and start the connection again.

Automatic Update of Multiple-device Simultaneous Connection Setting in Connection List in Case of Connection Failure In the connection list, a multiple-device simultaneous connection setting is registered when the display apparatus 20 is successfully connected to the communication terminal 40. When the display apparatus 20 is connected to the communication terminal 40, the possibility that the display apparatus 20 is connected to the communication terminal 40 increases by automatically switching the current setting to the multiple-device simultaneous connection setting registered in the connection list.

When a connection failure (an interruption of the connection process) in connecting to the communication terminal 40 is detected, the connection list management unit 26 sets the multiple-device simultaneous connection setting associated with the communication terminal 40 in the connection list to "not to permit."

Figure 21A:
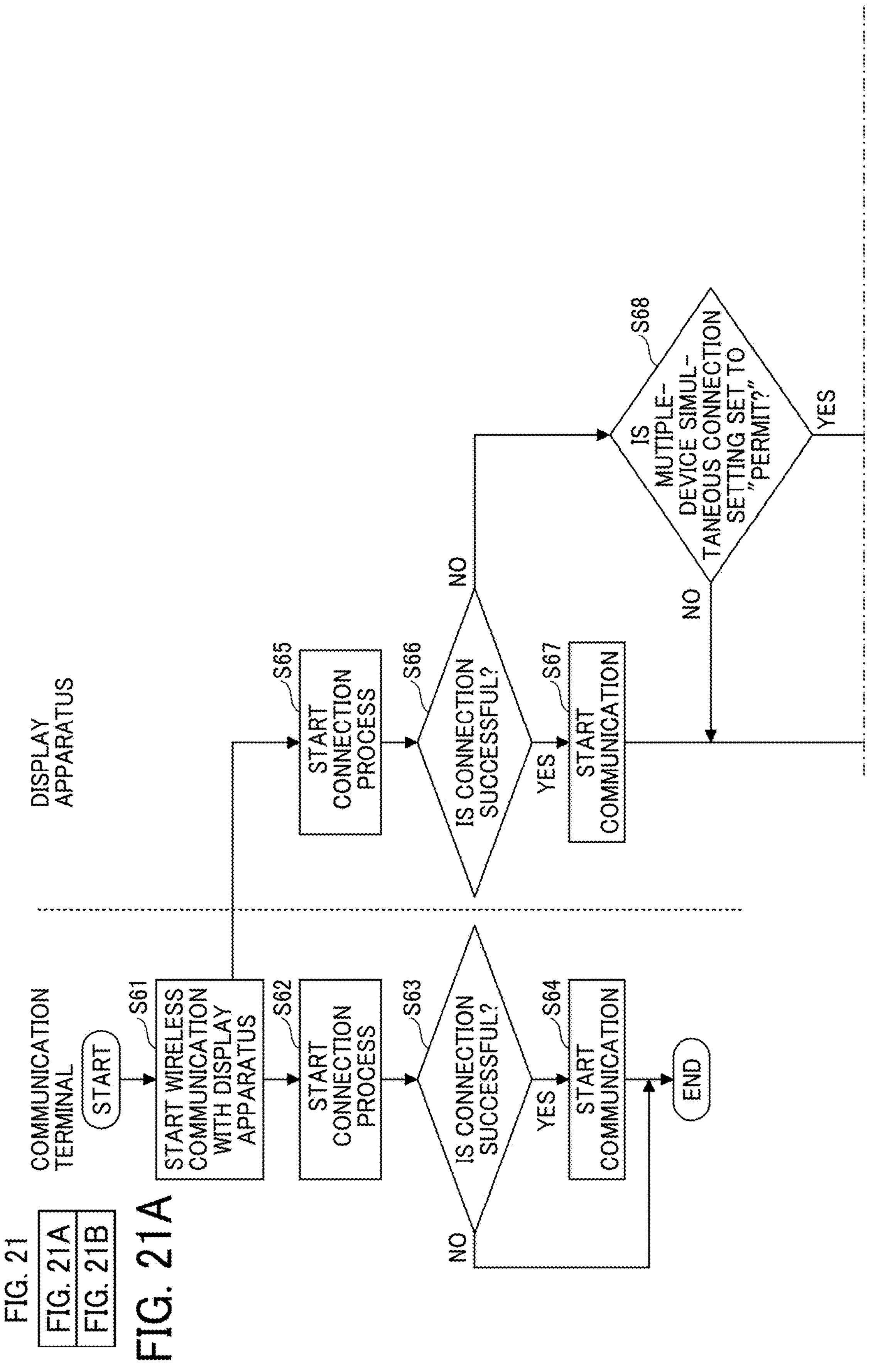
FIG. 21 (FIGS. 21A and 21B) is a flowchart of a process in which a connection list management unit registers "not permit" in a multiple-device simultaneous connection setting in a connection list when a display apparatus fails to be connected to a communication terminal, according to an embodiment of the present disclosure.
Figure 21B:
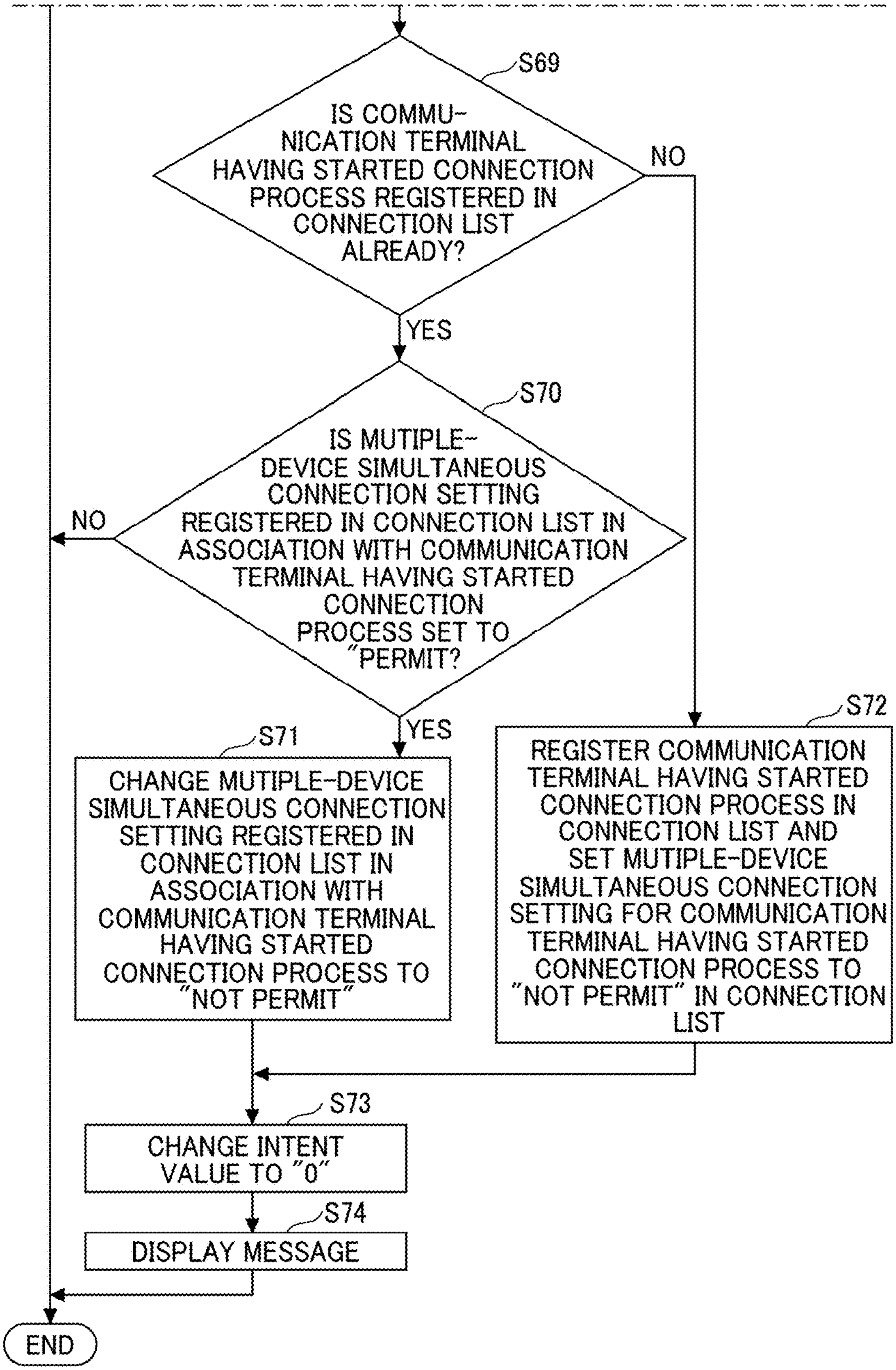

FIG. 21 (FIGS. 21A and 21B) is a flowchart of a process in which the connection list management unit 26 registers "not permit" in a multiple-device simultaneous connection setting in the connection list when the display apparatus 20 fails to be connected to the communication terminal 40, according to the present embodiment. The process from S61 to S67 may be similar to that from S31 to S37 in FIG. 17. However, in step S65, the setting change unit 25 tries two values as the intent value. One of the values is an intent value corresponding to the multiple-device simultaneous connection setting set on the multiple-device simultaneous connection setting screen 210. The other is an intent value based on the multiple-device simultaneous connection setting associated with the communication terminal 40 attempting the connection, whose AP has been searched for in the connection list when the setting changing unit 25 determines the group owner.

In the case where the connection is unsuccessful in step S66 (NO in S66), the setting change unit 25 determines whether the multiple-device simultaneous connection setting is set to "permit" on the multiple-device simultaneous connection setting screen 210 (S68).

In the case where the multiple-device simultaneous connection setting is determined to be set to "not permit" on the multiple-device simultaneous connection setting screen 210 (NO in S68), the process executed by the display apparatus 20 ends since the multiple-device simultaneous connection setting is already set to "not permit."

In the case where the multiple-device simultaneous connection setting is determined to be set to "permit" on the multiple-device simultaneous connection setting screen 210 (YES in S68), the setting change unit 25 determines whether the communication terminal 40 that has started the connection process is registered in the connection list already (S69).

In the case where the result of the determination in step S69 is YES (YES in S69), the setting change unit 25 determines whether the multiple-device simultaneous connection setting registered in the connection list in association with the communication terminal 40 is "permit" (S70). In the case where the multiple-device simultaneous connection setting registered in the connection list is determined to be set to "not permit" (NO in S70), the process executed by the display apparatus 20 ends since the multiple-device simultaneous connection setting is already set to "not permit."

In the case where the multiple-device simultaneous connection setting registered in the connection list is determined to be set to "permit" (YES in S70), the setting change unit 25 changes the multiple-device simultaneous connection setting registered in the connection list in association with the communication terminal 40 to "not permit" (S71).

On the other hand, in the case where the communication terminal 40 that has started the connection process is determined not yet to be registered in the connection list (NO in S69), the setting change unit 25 registers the communication terminal 40 that has attempted the connection in the connection list, and sets the multiple-device simultaneous connection setting to "not permit" in association with the communication terminal 40 that has attempted the connection (S72).

Since "not permit" is set in the multiple-device simultaneous connection setting of the connection list, the setting change unit 25 changes the intent value of the display apparatus 20 to "0" (S73).

The output unit 24 causes a pop-up message indicating that the multiple-device simultaneous connection setting has been changed to be displayed (S74). The pop-up screen 230 may be similar to that illustrated in FIG. 20.

In this way, the intent value of the display apparatus 20 is set to "0" and the display apparatus 20 plays a client. Thus, when the display apparatus 20 starts the connection with the same communication terminal 40 next time, the possibility that the display apparatus 20 is connected to the communication terminal 40 increases.

According to the present embodiment, the communication terminal 40 that is set to be prohibited from connecting to any APs other than the registered APs can connect to the display apparatus 20. The communication terminal 40 is often set to be prohibited from connecting to any APs other than the registered APs despite that there is no risk of information leakage by the communication terminal 40 connecting to the display apparatus 20. According to the present embodiment, the inconvenience that the communication terminal 40 cannot connect to the display apparatus 20 is eliminated.

Applied Cases

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

For example, in the present embodiment, the determination of the group owner when the display apparatus 20 and the communication terminal 40 connect to each other is described. In another embodiment, in the case where the display apparatus 20 and the communication terminal 40 already form a network group, another communication terminal 40 may participate in the network group. In this case, when the display apparatus 20 plays the group owner and the other communication terminal 40 is restricted to connect only to the registered APs, the other communication terminal 40 cannot participate in the network group. When the display apparatus 20 plays the group owner and the other communication terminal 40 is not restricted to connect only to the registered APs, the other communication terminal 40 participates in the network group as a client. When the display apparatus 20 plays a client and the other communication terminal 40 is restricted to connect only to the registered APs, the other communication terminal 40 cannot participate in the network group. When the display apparatus 20 plays a client and the other communication terminal 40 is not restricted to connect only to the registered APs, the other communication terminal 40 participates in the network group as a client (the group owner is the communication terminal 40 that has already formed the network group).

In the present embodiment, the case where the display apparatus 20 displays a video has been described. However, for example, the present embodiment is also suitably applicable to a case where the display apparatus 20 receives only audio and outputs only audio.

In the present embodiment, the case where the display apparatus 20 is of a portable type has been described. Alternatively, the display apparatus 20 may be of a stationary type. In such a case, operators can cause the videos of their own communication terminals 40 to be displayed on a large size of display apparatus 20 in, for example, a conference room. Examples of the large size of display apparatus 20 include an electronic whiteboard and a digital signage.

The communication terminal 40 and the display apparatus 20 may be of the same model. For example, assuming that both the communication terminal 40 and the display apparatus 20 are electronic whiteboards, each whiteboard can display the screen of the other whiteboard at a teleconference.

The functional configuration according to the present embodiment illustrated in FIG. 5 is divided according to functions in order to facilitate understanding of the processing units executed by the display apparatus 20. No limitation to the scope of the present disclosure is intended by how the processing units are divided or by the names of the processing units. The processing units executed by the display apparatus 20 may be divided into a greater number of processing units in accordance with the contents of the processing units. In addition, a single processing unit can be divided to include a greater number of processing units.

Each of the functions of the embodiment described above may be implemented by one or more processing circuits or circuitry. The "processing circuit or circuitry" herein includes a programmed processor to execute each function by software, such as a processor implemented by an electronic circuit, and devices, such as an application-specific integrated circuit (ASIC), a digital signal processor (DSP), a field-programmable gate array (FPGA), and circuit modules known in the art arranged to perform the recited functions.

Embodiments of the present disclosure can provide significant enhancements in computer capability and functionality. These enhancements allow users to take advantage of computers that provide more efficient and robust interaction with tables, which is a way to store and present information on information processing apparatuses. In addition, the embodiments of the present disclosure can provide a better operator experience through the use of a more efficient, powerful, and robust user interface. Such a user interface provides a better interaction between a human and a machine.

Aspects of the present disclosure are, for example, as follows.

According to Aspect 1, an information processing apparatus that can wirelessly communicate with another information processing apparatus in a role of either a group owner or a client includes:

a setting change unit that changes a setting relating to the role in response to an operation performed by an operator;

a determination unit that determines the role based on the setting related to the role changed by the setting change unit; and a wireless connection control unit that wirelessly communicates with the other information processing apparatus in the role determined by the determination unit.

According to Aspect 2, the information processing apparatus according to Aspect 1 further includes:

an output unit that controls a display to display a screen for receiving the setting relating to the role; and an operation reception unit that receives a change of the setting relating to the role.

According to Aspect 3, in the information processing apparatus according to Aspect 2, in a case that the wireless connection control unit fails to be wirelessly connected to the other information processing apparatus, the output unit controls the display to display a message prompting the change of the setting relating to the role.

According to Aspect 4, in the information processing apparatus according to Aspect 2 or 3, the setting change unit sets an intent value associated with the setting relating to the role;

the determination unit compares the intent value transmitted from the other information processing apparatus with the intent value of the information processing apparatus, and determines one of the information processing apparatus and the other information processing apparatus having a larger intent value to be the group owner;

the setting relating to the role is a multiple-device simultaneous connection setting that is set to "permit" or "not permit" to indicate whether to permit or not to permit multiple other information processing apparatuses to simultaneously connect to the information processing apparatus;

in a case that the multiple-device simultaneous connection setting is set to "permit," the setting change unit sets the intent value to a maximum value; and in a case that the multiple-device simultaneous connection setting is set to "not permit," the setting change unit sets the intent value to a minimum value.

According to Aspect 5, in the information processing apparatus according to Aspect 4, in the case that the wireless connection control unit fails to be wirelessly connected to the other information processing apparatus, the setting change unit sets the multiple-device simultaneous connection setting to "not permit," and further sets the intent value to the minimum value.

According to Aspect 6, in the information processing apparatus according to Aspect 5, in a case that the setting change unit sets the multiple-device simultaneous connection setting to "not permit," the output unit controls the display to display a message indicating that the setting relating to the role has been changed and prompting a connection process again.

According to Aspect 7, the information processing apparatus according to Aspect 4 further includes a connection list management unit that stores a connection list of the multiple other information processing apparatuses to which the information processing apparatus has been successfully connected. The connection list management unit records, in association with the other information processing apparatus, a result indicating which of "permit" and "not permit" is set for a successful connection. The setting change unit changes the multiple-device simultaneous connection setting to the setting of "permit" or "not permit" indicated by the result recorded in the connection list in association with the other information processing apparatus that starts a connection process.

According to Aspect 8, in the information processing apparatus according to Aspect 7, in the case that the wireless connection control unit fails to be wirelessly connected to the other information processing apparatus, the setting change unit changes the setting of "permit" recorded in the connection list in association with the other information processing apparatus that has failed in the connection to "not permit."

According to Aspect 9, in the information processing apparatus according to Aspect 7, in a case that the wireless connection control unit fails to be wirelessly connected to the other information processing apparatus and the other information processing apparatus that has failed in the connection is not registered in the connection list, the connection list management unit registers the other information processing apparatus that has failed in the connection in the connection list, and sets the setting to "not permit" in association with the other information processing apparatus that has failed in the connection.

According to Aspect 10, in the information processing apparatus according to Aspect 8 or 9, in a case that the setting change unit sets the multiple-device simultaneous connection setting of the other information processing apparatus that has failed in the connection to "not permit," the output unit controls the display to display a message indicating that the setting relating to the role has been changed and prompting the connection process again.

According to Aspect 11, a display apparatus includes the information processing apparatus according to any one of Aspects 1 to 10 or can be connected to the information processing apparatus according to any one of Aspects 1 to 10.

According to Aspect 12, the information processing apparatus according to Aspect 4 is a display apparatus, the display apparatus can obtain a video (an image) from a communication terminal that is the other information processing apparatus via wireless communication to display the video (image), and the display apparatus includes a display device for displaying the video obtained from the communication terminal and a setting screen of the multiple-device simultaneous connection setting.

According to Aspect 13, in the information processing apparatus according to Aspect 12, the display apparatus is a portable display apparatus.

According to Aspect 14, in the information processing apparatus according to Aspect 12, the display apparatus is an electronic whiteboard.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An information processing apparatus, comprising circuitry configured to:

change a setting relating to a role of either a group owner or a client in response to a user operation;

determine the role based on the setting related to the role;

wirelessly communicate with another information processing apparatus in the role that is determined;

control a display to display a screen for receiving the setting relating to the role; and receive, as the user operation, a change of the setting relating to the role;

set an intent value associated with the setting relating to the role;

compare the intent value transmitted from the another information processing apparatus with the intent value of the information processing apparatus; and determine one of the information processing apparatus and the another information processing apparatus having a larger intent value to be the group owner, wherein the setting relating to the role is a multiple-device simultaneous connection setting that is set to "permit" or "not permit" to indicate whether to permit or not to permit a plurality of other information processing apparatuses to simultaneously connect to the information processing apparatus, in a case that the multiple-device simultaneous connection setting is set to "permit," the circuitry is configured to set the intent value to a first intent value, and in a case that the multiple-device simultaneous connection setting is set to "not permit," the circuitry is configured to set the intent value to a second intent value being smaller than the first intent value.

2. The information processing apparatus according to claim 1, wherein, in a case that the information processing apparatus fails to be wirelessly connected to the another information processing apparatus, the circuitry is configured to control the display to display a message prompting the change of the setting relating to the role.

3. The information processing apparatus according to claim 1, wherein, in a case that the information processing apparatus fails to be wirelessly connected to the another information processing apparatus, the circuitry is configured to set the multiple-device simultaneous connection setting to "not permit," and further set the intent value to the second intent value.

4. The information processing apparatus according to claim 3, wherein, in a case that the multiple-device simultaneous connection setting is set to "not permit," the circuitry is configured to control the display to display a message indicating that the setting relating to the role has been changed and prompting a connection process again.

5. The information processing apparatus according to claim 1, wherein the circuitry is further configured to:

store a connection list of the plurality of other information processing apparatuses to which the information processing apparatus has been successfully connected;

record, in association with the another information processing apparatus, a result indicating which of "permit" and "not permit" is set for a successful connection; and change the multiple-device simultaneous connection setting to the setting of "permit" or "not permit" indicated by the result recorded in the connection list in association with the another information processing apparatus that starts a connection process.

6. The information processing apparatus according to claim 5, wherein, in a case that the information processing apparatus fails to be wirelessly connected to the another information processing apparatus, the circuitry is configured to change the setting of "permit" recorded in the connection list in association with the another information processing apparatus that has failed in the connection to "not permit".

7. The information processing apparatus according to claim 5, wherein, in a case that the information processing apparatus fails to be wirelessly connected to the another information processing apparatus and the another information processing apparatus that has failed in the connection is not registered in the connection list, the circuitry is further configured to register the another information processing apparatus that has failed in the connection in the connection list, and set the setting to "not permit" in association with the another information processing apparatus that has failed in the connection.

8. The information processing apparatus according to claim 6, wherein, in a case that the multiple-device simultaneous connection setting of the another information processing apparatus that has failed in the connection is set to "not permit," the circuitry is configured to control the display to display a message indicating that the setting relating to the role has been changed and prompting the connection process again.

9. The information processing apparatus according to claim 1, further comprising a display device configured to display an image and a setting screen of the multiple-device simultaneous connection setting, the image being obtained from the another information processing apparatus via wireless communication, the another information processing apparatus being a communication terminal.

10. The information processing apparatus according to claim 9, wherein the information processing apparatus is portable.

11. The information processing apparatus according to claim 9, wherein the information processing apparatus is an electronic whiteboard.

12. A communication method performed by an information processing apparatus, the method comprising:

changing a setting relating to a role of either a group owner or a client in response to a user operation;

determining the role based on the setting related to the role;

wirelessly communicating with the another information processing apparatus in the role that is determined;

controlling a display to display a screen for receiving the setting relating to the role; and receiving, as the user operation, a change of the setting relating to the role;

setting an intent value associated with the setting relating to the role;

comparing the intent value transmitted from the another information processing apparatus with the intent value of the information processing apparatus; and determining one of the information processing apparatus and the another information processing apparatus having a larger intent value to be the group owner, wherein the setting relating to the role is a multiple-device simultaneous connection setting that is set to "permit" or "not permit" to indicate whether to permit or not to permit a plurality of other information processing apparatuses to simultaneously connect to the information processing apparatus, in a case that the multiple-device simultaneous connection setting is set to "permit," setting the intent value to a first intent value, and in a case that the multiple-device simultaneous connection setting is set to "not permit," setting the intent value to a second intent value being smaller than the first intent value.

13. A non-transitory recording medium storing a plurality of program codes which, when executed by one or more processors, causes the one or more processors to perform the method according to claim 12.

14. A communication system comprising:

an information processing apparatus; and another information processing apparatus, the information processing apparatus being configured to wirelessly communicate with the another information processing apparatus in a role of either a group owner or a client, the information processing apparatus including circuitry configured to:

change a setting relating to the role in response to a user operation;

determine the role based on the setting related to the role;

wirelessly communicate with the another information processing apparatus in the role, the another information processing apparatus being configured to communicate with the information processing apparatus in the role different from the role that the information processing apparatus wirelessly communicates;

control a display to display a screen for receiving the setting relating to the role; and receive, as the user operation, a change of the setting relating to the role;

set an intent value associated with the setting relating to the role;

compare the intent value transmitted from the another information processing apparatus with the intent value of the information processing apparatus; and determine one of the information processing apparatus and the another information processing apparatus having a larger intent value to be the group owner, wherein the setting relating to the role is a multiple-device simultaneous connection setting that is set to "permit" or "not permit" to indicate whether to permit or not to permit a plurality of other information processing apparatuses to simultaneously connect to the information processing apparatus, in a case that the multiple-device simultaneous connection setting is set to "permit," the circuitry is configured to set the intent value to a first intent value, and in a case that the multiple-device simultaneous connection setting is set to "not permit," the circuitry is configured to set the intent value to a second intent value being smaller than the first intent value.

* * * * *